United States Patent
Yuan et al.

(10) Patent No.: US 12,248,576 B2
(45) Date of Patent: Mar. 11, 2025

(54) FACE RECOGNITION METHOD AND APPARATUS

(71) Applicant: Honor Device Co., Ltd., Shenzhen (CN)

(72) Inventors: Jiangfeng Yuan, Shenzhen (CN); Zhichao Li, Shenzhen (CN); Jianming Lv, Shenzhen (CN); Junwei Zhou, Shenzhen (CN); Yichao Zhang, Shenzhen (CN); Xiaogang Feng, Shenzhen (CN); Kun Ma, Shenzhen (CN); Chuan Liao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/914,208

(22) PCT Filed: May 10, 2022

(86) PCT No.: PCT/CN2022/092043
§ 371 (c)(1),
(2) Date: Sep. 23, 2022

(87) PCT Pub. No.: WO2023/015996
PCT Pub. Date: Feb. 16, 2023

(65) Prior Publication Data
US 2024/0232359 A1    Jul. 11, 2024

(30) Foreign Application Priority Data
Aug. 12, 2021    (CN) .......................... 202110925835.8

(51) Int. Cl.
*G06F 21/57*    (2013.01)
*G06F 21/32*    (2013.01)
(Continued)

(52) U.S. Cl.
CPC .............. *G06F 21/57* (2013.01); *G06F 21/32* (2013.01); *G06V 10/12* (2022.01); *G06V 40/172* (2022.01); *G06F 2221/034* (2013.01)

(58) Field of Classification Search
None
See application file for complete search history.

(56) References Cited

U.S. PATENT DOCUMENTS

2019/0207932 A1*    7/2019    Bud ....................... G07C 9/257

FOREIGN PATENT DOCUMENTS

| CN | 107944429 A | 4/2018 |
|----|-------------|--------|
| CN | 108769542 A | 11/2018 |

(Continued)

OTHER PUBLICATIONS

Block, VC, "The Beauty of Consensus: The Panorama and Future of the Blockchain Economy", Economic Daily Press, Blockchain Technology and Investment Hot Track, Chapter 4, Apr. 30, 2020, 3 Pages.

*Primary Examiner* — Brandon Hoffman
(74) *Attorney, Agent, or Firm* — Slater Matsil, LLP

(57) ABSTRACT

Embodiments of this application provide a face recognition method and apparatus, including: obtaining TOF data; processing the TOF data into a TOF image in a TEE; and performing face recognition by using the TOF image, to obtain a recognition result. Because the TOF data is used for face recognition, higher security is achieved. Implementation in the TEE can further improve the security.

19 Claims, 18 Drawing Sheets

(51) Int. Cl.
*G06V 10/12* (2022.01)
*G06V 40/16* (2022.01)

(56) References Cited

FOREIGN PATENT DOCUMENTS

| | | | |
|---|---|---|---|
| CN | 108804895 | A | 11/2018 |
| CN | 110474874 | A | 11/2019 |
| CN | 110555706 | A | 12/2019 |
| CN | 110619200 | A | 12/2019 |
| CN | 110750772 | A | 2/2020 |
| CN | 110933307 | A | 3/2020 |
| CN | 210691384 | U | 6/2020 |
| CN | 113779588 | A | 12/2021 |
| EP | 4160475 | A1 | 4/2023 |

* cited by examiner

US 12,248,576 B2

FACE RECOGNITION METHOD AND APPARATUS

CROSS-REFERENCE TO RELATED APPLICATIONS

This application is a National Stage of International Application No. PCT/CN2022/092043, filed on May 10, 2022, which claims priority to Chinese Patent Application No. 202110925835.8, filed on Aug. 12, 2021. Both of the aforementioned applications are hereby incorporated by reference in their entireties

TECHNICAL FIELD

This application relates to the field of electronic information, and in particular, to a face recognition method and apparatus.

BACKGROUND

Face recognition is widely used in electronic devices to recognize authorized users. For example, a face unlock function is used to determine, based on whether face recognition succeeds, whether to unlock a screen.

Currently, RGB (Red Green Blue) data is usually used for face recognition. Because the RGB data is greatly affected by light, face recognition using the RGB data is prone to attacks. Therefore, security of face recognition needs to be improved.

SUMMARY

This application provides a face recognition method and apparatus to resolve a problem about how to improve security of face recognition.

To achieve the foregoing objective, this application provides the following technical solutions:

A first aspect of this application provides a face recognition method, including: obtaining time-of-flight TOF data; processing the TOF data into a TOF image in a trusted execution environment TEE; and performing face recognition in the TEE by using the TOF image, to obtain a recognition result. Security of face recognition performed by using the TOF data is high. Because TOF data processing and face recognition are performed in the TEE, security can be further improved.

Optionally, before the processing the TOF data into a TOF image in a trusted execution environment TEE, the method further includes: storing the obtained TOF data in the TEE, to lay a basis for processing the TOF data in the TEE.

Optionally, the method further includes: transmitting storage information of the TOF data in the TEE to the TEE, to lay a basis for processing the TOF data in the TEE. In addition, transmitting the storage information instead of the TOF data can further improve security and can also save transmission bandwidth resources.

Optionally, the processing the TOF data into a TOF image in a trusted execution environment TEE includes: reading the TOF data by using the storage information in the TEE; and processing the TOF data into the TOF image, to adapt to a transmission mode of transmitting the storage information instead of the TOF data.

Optionally, the processing the TOF data into a TOF image includes: generating the TOF image by using the TOF data and calibration data of a TOF camera. Using the calibration data to generate the TOF data helps obtain a TOF image with high quality.

Optionally, before the generating the TOF image by using the TOF data and calibration data of a TOF camera, the method further includes: transmitting the calibration data from a rich execution environment REE to the TEE, to lay a basis for generating the TOF image in the TEE.

Optionally, the method further includes: generating a safety flag or an AE result in the TEE based on the TOF data, where the safety flag is used to indicate whether a TOF light source is safe for human eyes, and the AE result is used to adjust an exposure parameter of the TOF camera. Generation of the safety flag or the AE result helps implement more functions.

Optionally, after the generating a safety flag or an AE result, the method further includes: transmitting the safety flag or the AE result to the rich execution environment REE; and controlling the TOF camera in the REE based on the safety flag or the AE result. This helps improve security of the TOF camera or improve quality of TOF data captured subsequently.

Optionally, the generating a safety flag includes: generating the safety flag based on a safety indication frame in the TOF data. The safety indication frame comes from the TOF data and therefore can more accurately reflect whether infrared light of the TOF camera is safe for human eyes.

Optionally, the generating an AE result includes: generating the AE result based on a face recognition frame in the TOF data; and the processing the TOF data into a TOF image includes: processing the face recognition frame into the TOF image. Dividing the TOF data into a safety indication frame and a face recognition frame can implement a human eye safety indication function. Therefore, a purpose of processing the face recognition frame is to be compatible with the human eye safety indication function while face recognition is implemented based on the TOF data.

Optionally, the TOF image includes a depth map and an infrared image; and the performing face recognition by using the TOF image includes: performing anti-counterfeit recognition by using the depth map and the infrared image; and performing face comparison by using the infrared image and a preset face template. Performing both anti-counterfeit recognition and face comparison helps improve security of face recognition.

Optionally, after the obtaining a recognition result, the method further includes: transmitting the recognition result from the TEE to an application of the REE, to trigger the application to perform a task by using the recognition result, thereby achieving an objective of using the face recognition based on the TOF data to implement a specific function by the application.

Optionally, the performing face recognition by using the TOF image, to obtain a recognition result includes: performing face recognition by using the TOF image generated based on a first frame of TOF data, to obtain the recognition result, so as to improve an execution speed of face recognition.

Optionally, the TOF data includes: the first frame of TOF data, where the first frame of TOF data includes projection-off data and infrared data, and the projection-off data is TOF data captured by the TOF camera when the TOF light source is turned off. The projection-off data lays a basis for mitigating an overexposure of the infrared data.

Optionally, the processing the TOF data into a TOF image includes: determining that a data block in which a quantity of data points whose values are greater than a first threshold is greater than a second threshold exists in the infrared data; and processing a difference between the infrared data and the projection-off data into the TOF image. The data block in which the quantity of data points whose values are greater than the first threshold is greater than the second threshold is an overexposed data block, and the projection-off data is the TOF data captured by the TOF camera when the TOF light source is turned off. Therefore, the difference between the infrared data and the projection-off data can correct an overexposure problem of the infrared data.

Optionally, the processing the TOF data into a TOF image includes: processing the TOF data into the TOF image in camera domain; and the performing face recognition by using the TOF image includes: performing face recognition in face domain by using the TOF image. Therefore, there is no need to perform excessive interaction between different domains. This can reduce workload of coupling, make logic clear, and facilitate development and maintenance.

Optionally, before the processing the TOF data into a TOF image in a trusted execution environment TEE, the method further includes: storing, by using a kernel layer, the obtained TOF data into a first secure buffer storage unit of the TEE as first storage information; and transmitting the first storage information to the TEE by using a communication protocol of the REE. Transmission of the first storage information is implemented by using an Android operating system. This helps improve compatibility and implementability.

Optionally, the transmitting the first storage information to the TEE by using a communication protocol of the REE includes: transmitting the first storage information to a camera HAL3 at a hardware abstraction layer by using the kernel layer; transmitting the first storage information to a camera service at an application program framework layer by using the camera HAL3; transmitting the first storage information to a face application client at the hardware abstraction layer by using the camera service; and transmitting the first storage information to a face trusted application of the TEE by using the face application client. Therefore, transmission of the first storage information can be implemented by using the communication protocol between various layers in the Android operating system. This helps improve compatibility and implementability.

Optionally, another implementation of the transmitting the first storage information to the TEE by using a communication protocol of the REE includes: transmitting the first storage information to a TOF node at a hardware abstraction layer by using the kernel layer; transmitting the first storage information to a TOF application client at the hardware abstraction layer by using the TOF node; and transmitting the first storage information to a TOF trusted application of the TEE by using the TOF application client. This implementation is applicable to a scenario in which camera domain data and face domain data are processed separately.

Optionally, the processing the TOF data into a TOF image in a trusted execution environment TEE includes: transmitting the first storage information to a data processing module of the TEE by using the face trusted application or the TOF trusted application of the TEE; and reading the TOF data from the first secure buffer storage unit based on the first storage information by using the data processing module, and processing the TOF data into the TOF image.

Optionally, after the processing the TOF data into the TOF image, the method further includes: storing the TOF image into a second secure buffer storage unit of the TEE as second storage information by using the data processing module; transmitting the second storage information to the face trusted application or the TOF trusted application by using the data processing module; and transmitting the second storage information to a face recognition module by using the face trusted application or the TOF trusted application. Transmission of the storage information of the TOF image instead of the TOF image can save transmission bandwidth resources of the TEE.

Optionally, the transmitting the second storage information to a face recognition module of the TEE by using the TOF trusted application includes: transmitting the second storage information to the TOF application client at the hardware abstraction layer by using the TOF trusted application; transmitting the second storage information to the TOF node at the hardware abstraction layer by using the TOF application client; transmitting the second storage information to the camera HAL3 at the hardware abstraction layer by using the TOF node; transmitting the second storage information to the camera service at the application program framework layer by using the camera HAL3; transmitting the second storage information to the face application client at the hardware abstraction layer by using the camera service; transmitting the second storage information to the face trusted application of the TEE by using the face application client; and transmitting the second storage information to the face recognition module of the TEE by using the face trusted application, so that the implementation is applicable to the scenario in which the camera domain data and the face domain data are processed separately.

Optionally, the performing face recognition in the TEE by using the TOF image, to obtain a recognition result includes: reading the TOF image based on the second storage information by using the face recognition module; and performing face recognition on the TOF image to obtain the recognition result.

Optionally, before the processing the TOF data into the TOF image, the method further includes: transmitting the calibration data in the REE to the camera service by using the camera HAL3; transmitting the calibration data to the face application client by using the camera service; and transmitting the calibration data to the face trusted application of the TEE by using the face application client. Transmission of the calibration data based on each layer of the Android operating system lays a basis for generating the TOF image in the TEE. This helps improve compatibility and implementability.

Optionally, before the processing the TOF data into the TOF image, the method further includes: transmitting the calibration data in the REE to the TOF application client at the hardware abstraction layer by using the TOF node; and transmitting the calibration data to the TOF trusted application of the TEE by using the TOF application client, so that the implementation is applicable to the scenario in which the camera domain data and the face domain data are processed separately.

Optionally, the method further includes: storing the calibration data in a calibration data storage unit of the TEE by using the face trusted application or the TOF trusted application. Therefore, the calibration data is not transmitted repeatedly when a processor running the TEE is not powered off, to save transmission bandwidth resources.

Optionally, after the obtaining a recognition result, the method further includes: transmitting the recognition result to the face application client at the hardware abstraction layer of the REE by using the face trusted application of the TEE; transmitting the recognition result to a face service at the application program framework layer of the REE by using the face application client; and transmitting, by using the face service, the recognition result to an application that initiates a task at an application program layer of the REE, where the recognition result is used by the application to perform the task. By using each layer of the REE, a path for transmitting the recognition result to the application that triggers face recognition is provided. This achieves high compatibility and implementability.

Optionally, before the obtaining time-of-flight TOF data, the method further includes: transmitting a task request to the face service at the application program framework layer by using the application at the application program layer; transmitting the task request to the face application client at the hardware abstraction layer by using the face service; transmitting an image request to the camera service at the application program framework layer by using the face application client, to respond to the task request; and transmitting the image request to the camera HAL3 at the hardware abstraction layer by using the camera service, where the image request is used by the camera HAL3 to control the TOF camera to capture the TOF data, to provide an implementation for triggering the TOF camera to capture the TOF data based on the Android operating system.

Optionally, the method further includes: generating the safety flag or the AE result based on the TOF data by using the data processing module of the TEE, where the safety flag is used to indicate whether the TOF light source is safe for human eyes, and the AE result is used to adjust the exposure parameter of the TOF camera, to lay a basis for implementing more functions.

Optionally, after the generating the safety flag or the AE result, the method further includes: transmitting the safety flag or the AE result to the face application client at the hardware abstraction layer of the REE by using the face trusted application of the TEE; transmitting the safety flag or the AE result to the camera service at the application program framework layer of the REE by using the face application client; transmitting to the camera HAL3 at the hardware abstraction layer by using the camera service; and controlling the TOF camera based on the safety flag or the AE result by using the camera HAL3. By using the Android operating system, more functions can be implemented, while security of face recognition is improved.

Optionally, after the generating the safety flag or the AE result, the method further includes: transmitting the safety flag or the AE result to the TOF application client at the hardware abstraction layer of the REE by using the TOF trusted application of the TEE; transmitting the safety flag or the AE result to the TOF node at the hardware abstraction layer by using the TOF application client; transmitting to the camera HAL3 at the hardware abstraction layer by using the TOF node; and controlling the TOF camera based on the safety flag or the AE result by using the camera HAL3, so that the implementation is applicable to the scenario in which the camera domain data and the face domain data are processed separately.

A second aspect of this application provides an electronic device, including a TOF camera, a memory, and a processor. The TOF camera is configured to capture time-of-flight TOF data; the memory is configured to store program code; and the processor is configured to run the program code to perform the face recognition method according to the first aspect of this application.

A third aspect of this application provides a system-on-chip, including at least one processor and an interface, where the interface is configured to receive code instructions and transmit the code instructions to the at least one processor; and the at least one processor runs the code instructions to implement the face recognition method according to the first aspect of this application.

A fourth aspect of this application provides a readable storage medium, where the readable storage medium stores program code, and when the program code is executed by a computer device, the face recognition method according to the first aspect of this application is implemented.

DETAILED DESCRIPTION OF ILLUSTRATIVE EMBODIMENTS

Figure 1A:
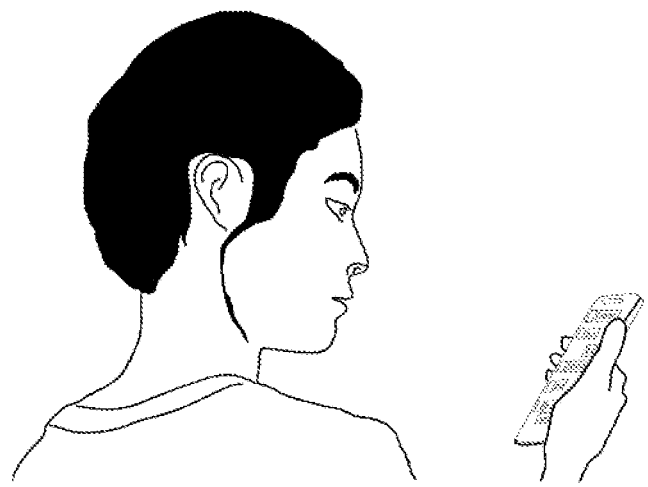
FIG. 1a is an exemplary diagram of a scenario of face recognition performed by using an electronic device.

FIG. 1a is a scenario of face recognition applied to an electronic device. When a user uses an electronic device such as a mobile phone to implement a function that requires user authorization, the user aligns a camera of the electronic device with a face automatically or according to prompt information sent by the electronic device. Currently, electronic devices are generally equipped with RGB cameras. After the electronic device captures an image by using an RGB camera, face recognition is performed by using the image. The face recognition includes but is not limited to comparison with a stored face template and anti-counterfeit recognition. After a recognition result is obtained, a task is performed based on the recognition result.

For example, the user expects to use the face to unlock a screen, and turns the screen of the mobile phone toward the face, so that the front-facing camera of the mobile phone captures a face image. After the mobile phone captures the image, the mobile phone performs face recognition by using the image. If the recognition succeeds, the screen is unlocked. If the recognition fails, the screen is kept in a locked state.

During research, the inventor finds that security of the electronic device needs to be improved when the electronic device uses the recognition result to recognize an authorized user: Currently, malicious attacks on faces may be mainly classified into plane attacks (such as counterfeiting real faces by using photos), head model mask attacks (such as counterfeiting real faces by using 3D models), and counterfeiting of similar faces.

During research, the inventor further finds that use of time-of-flight (Time-of-Flight, TOF) data for face recognition has the following characteristics: 1. The TOF data can generate a depth map and an infrared image, and therefore has high anti-counterfeit performance (that is, protection against plane attacks and head model mask attacks). 2. The TOF data is less affected by light. Therefore, quality of the TOF data is high, and a large threshold can be used for face comparison, thereby reducing a possibility of counterfeiting of similar faces. It can be seen that using the TOF data for face recognition can improve security.

However, a current mainstream hardware platform supports processing of RGB data only, and does not support processing of TOF data. For example, an image signal processor (image signal processor, ISP) in a current mainstream processor supports processing of RGB camera raw data (Camera Raw Data) captured by an RGB camera into RGB raw data (Raw Data) only, and TOF data (such as TOF camera data) captured by a TOF camera cannot be processed. However, redesigning the hardware platform to process the TOF data captured by the TOF camera is excessively expensive. Therefore, the TOF data captured by the TOF camera needs to be processed with the help of a software framework. Compared with hardware, software is more vulnerable to attacks. In this case, even if the TOF data is used for face recognition, there are still security holes.

The following embodiment of this application provides a face recognition method. The method is applied to an electronic device and intended to improve security of face recognition.

Figure 2:
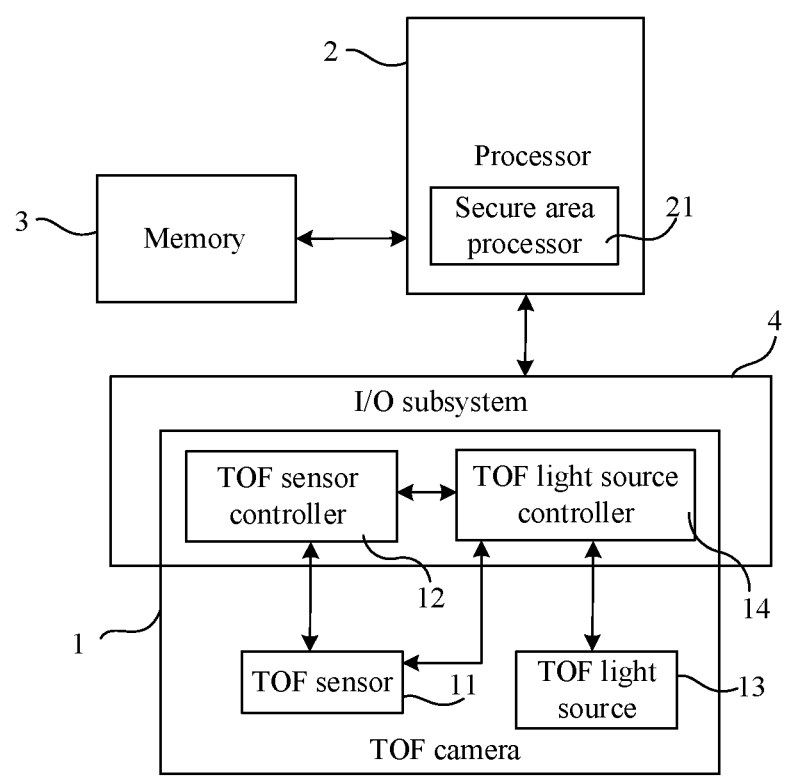
FIG. 2 is a schematic diagram of a structure of an electronic device according to an embodiment of this application.

FIG. 2 is an exemplary diagram of an electronic device. The electronic device includes a TOF camera 1, a processor 2, a memory 3, and an I/O subsystem 4.

The TOF camera 1 is configured to capture TOF data. In some implementations, the TOF camera 1 is disposed as a front-facing camera of the electronic device, and is configured to capture TOF data in front of a display screen (not shown in FIG. 2) of the electronic device, for example, capture TOF data of a face located in front of the display screen of the electronic device.

The TOF camera 1 includes a TOF sensor 11, a TOF sensor controller 12, a TOF light source 13, and a TOF light source controller 14.

In some implementations, the TOF light source controller 14 is controlled by the TOF sensor controller 12 to control the TOF light source 13. Under control of the TOF light source controller 14, the TOF light source 13 emits infrared (IR) light. The TOF sensor 11 is configured to sense reflected light of infrared (IR) light from an object such as a face, to capture TOF data.

The TOF sensor controller 12 and the TOF light source controller 14 are disposed in the I/O subsystem 4 and communicate with the processor 2 by using the I/O subsystem 4.

The memory 3 may be configured to store computer-executable program code. Specifically, the memory 3 may include a program storage area and a data storage area. The program storage area may store program code required for implementing an operating system, a software system, at least one function, and the like. The data storage area may store data obtained, generated and used during use of the electronic device.

In some implementations, the memory 3 may be completely or partially integrated in the processor 2 as an internal memory of the processor 2. In some implementations, the memory 3 is an external memory relative to the processor 2 and communicates with the processor 2 by using an external memory interface of the processor 2.

In some implementations, the memory 3 may include a high-speed random access memory, and may further include a non-volatile memory, for example, at least one magnetic disk storage device, a flash memory, or a universal flash storage (universal flash storage, UFS).

The processor 2 may include one or more processing units. For example, the processor 2 may include an application processor (application processor, AP), a graphics processing unit (graphics processing unit, GPU), and an image signal processor (image signal processor, ISP).

In some implementations, the processor 2 may include a secure area processor 21, data used in face recognition may be stored in the secure area processor 21, and the secure area processor 21 performs a procedure for processing the data by invoking the program code in the memory 3, to improve security of face recognition.

In some implementations, the secure area processor 21 is configured to store the TOF data captured by the TOF camera 1, generate a TOF image by using the TOF data, and perform face recognition processing by using the TOF image, to obtain a recognition result. The processor 2 may perform a task such as face unlocking or face payment by using the recognition result.

Optionally, the electronic device may further include an ambient light sensor (not shown in FIG. 2) for sensing light intensity of an environment in which the electronic device is located. It may be understood that the ambient light sensor communicates with the processor 2 by using an ambient light sensor controller (not shown in FIG. 2) disposed in the I/O subsystem 4.

It may be understood that a structure illustrated in this embodiment does not constitute a specific limitation on the electronic device. In other embodiments, the electronic device may include more or fewer components than those shown in the figure, or some components are combined, or some components are split, or component arrangements are different. The illustrated components may be implemented by hardware, software, or a combination of software and hardware.

It may be understood that the operating system implemented by the processor 2 by running the code stored in the memory 3 may be an iOS operating system, an Android open source operating system, a Windows operating system, a Harmony operating system, or the like. In the following embodiment, the Android open source operating system is used as an example for description.

Figure 3:
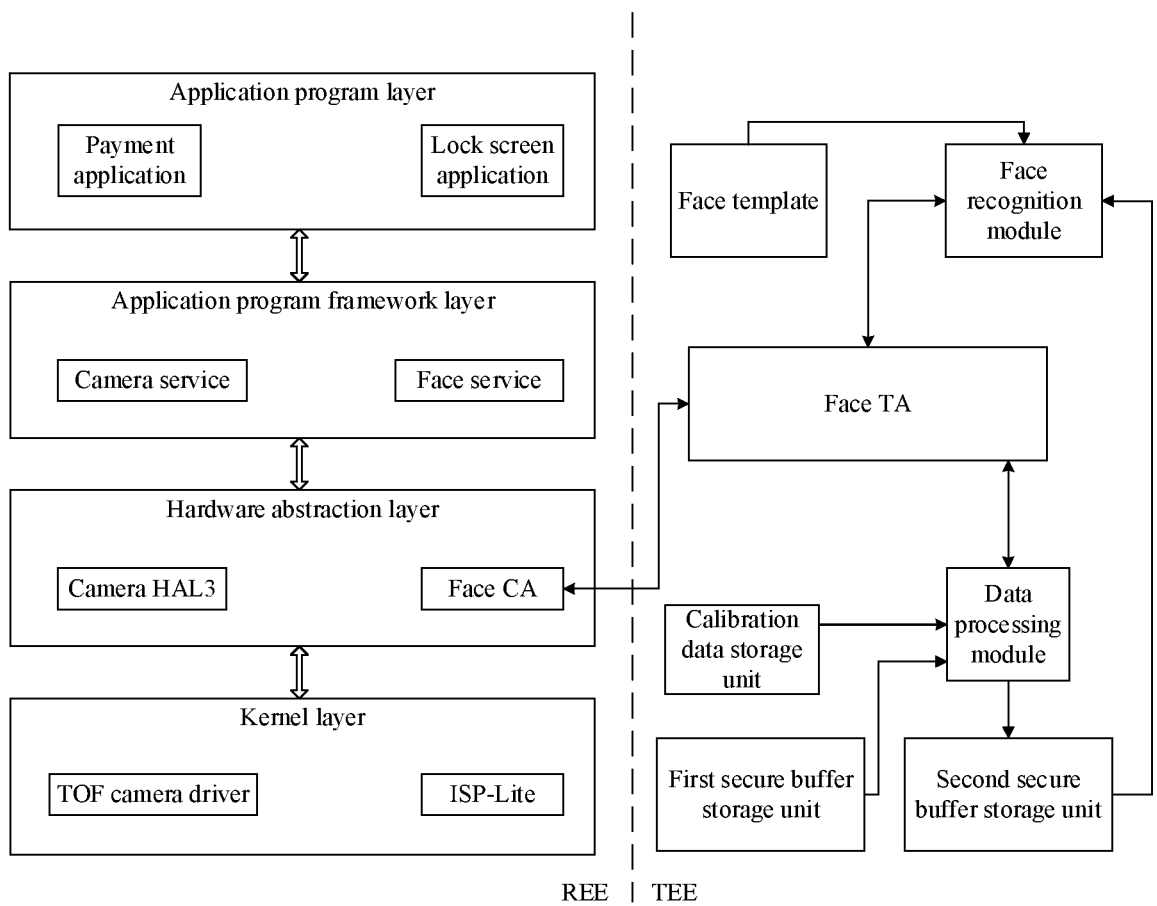
FIG. 3 is a schematic diagram of a software framework for implementing face recognition by an electronic device according to an embodiment of this application.

By running the program code stored in the memory 3, the processor 2 of the electronic device can implement a software framework based on the Android open source operating system shown in FIG. 3.

The software framework includes a trusted execution environment (Trusted Execution Environment, TEE) and a rich execution environment (Rich Execution Environment, REE) that can execute rich instructions. The TEE may be implemented by the secure area processor 21 in the processor 2 by running program code.

The REE includes various layers of the Android open source operating system, including but not limited to an application program layer, an application program framework layer, a hardware abstraction layer, and a kernel layer.

The application program layer may include a series of application program packages. As shown in FIG. 3, the application program package may include a payment application and a lock screen application. Each application may initiate task requests in different scenarios to trigger face recognition.

The application program framework layer provides an application programming interface (application programming interface, API) and a programming framework for application programs at the application program layer. The application program framework layer includes some predefined functions. As shown in FIG. 3, the application program framework layer may include a camera service (Camera service) and a face service (Face service). The camera service is used to implement a camera function. The face service is used to implement a face recognition function.

The hardware abstraction layer is used for hardware abstraction. The hardware abstraction layer hides hardware interface details of a specific platform, and provides a virtual hardware platform for the operating system, so that the operating system is hardware-independent and can be transplanted on various platforms. A camera hardware abstraction layer (Camera HAL3) at the hardware abstraction layer is used to control the camera in response to an instruction of the camera service. A face application client (Face Client application, Face CA, also referred to as a face client application) accesses a trusted application of the TEE by invoking an API (Application Programming Interface, application programming interface) of a TEE client located in the REE, to use the TEE and a security function provided by the trusted application.

The kernel layer is a layer between hardware and software. Hardware driver software is usually disposed at the kernel layer. In FIG. 3, one of functions of an ISP-Lite at the kernel layer is to drive the ISP-Lite (a part of the ISP) in the processor to convert the TOF data captured by the TOF sensor (such as TOF camera Raw Data) into a data format commonly used for image processing, such as TOF raw data (Raw Data). In the following embodiment, data obtained by the ISP-Lite through processing and the TOF data captured by the TOF camera are collectively referred to as TOF data. A TOF camera driver at the kernel layer is used to drive the TOF camera. The TEE includes various applications, modules, and units for performing face recognition based on the TOF data. A function of a face trusted application (Face Trusted Application, Face TA) is to invoke each module and unit in the TEE, and communicate with the REE. A data processing module is configured to process data such as raw data. A face recognition module is configured to implement functions such as face recognition by using a face template, and face template management.

Based on the framework shown in FIG. 3, the electronic device can process the TOF data into the TOF image in the TEE, and perform face recognition in the TEE by using the TOF image, to obtain the recognition result. In other words, on a basis of using the TOF data for face recognition to improve security, data processing and recognition are both implemented in the TEE. Therefore, security can be further improved.

Figure 4:
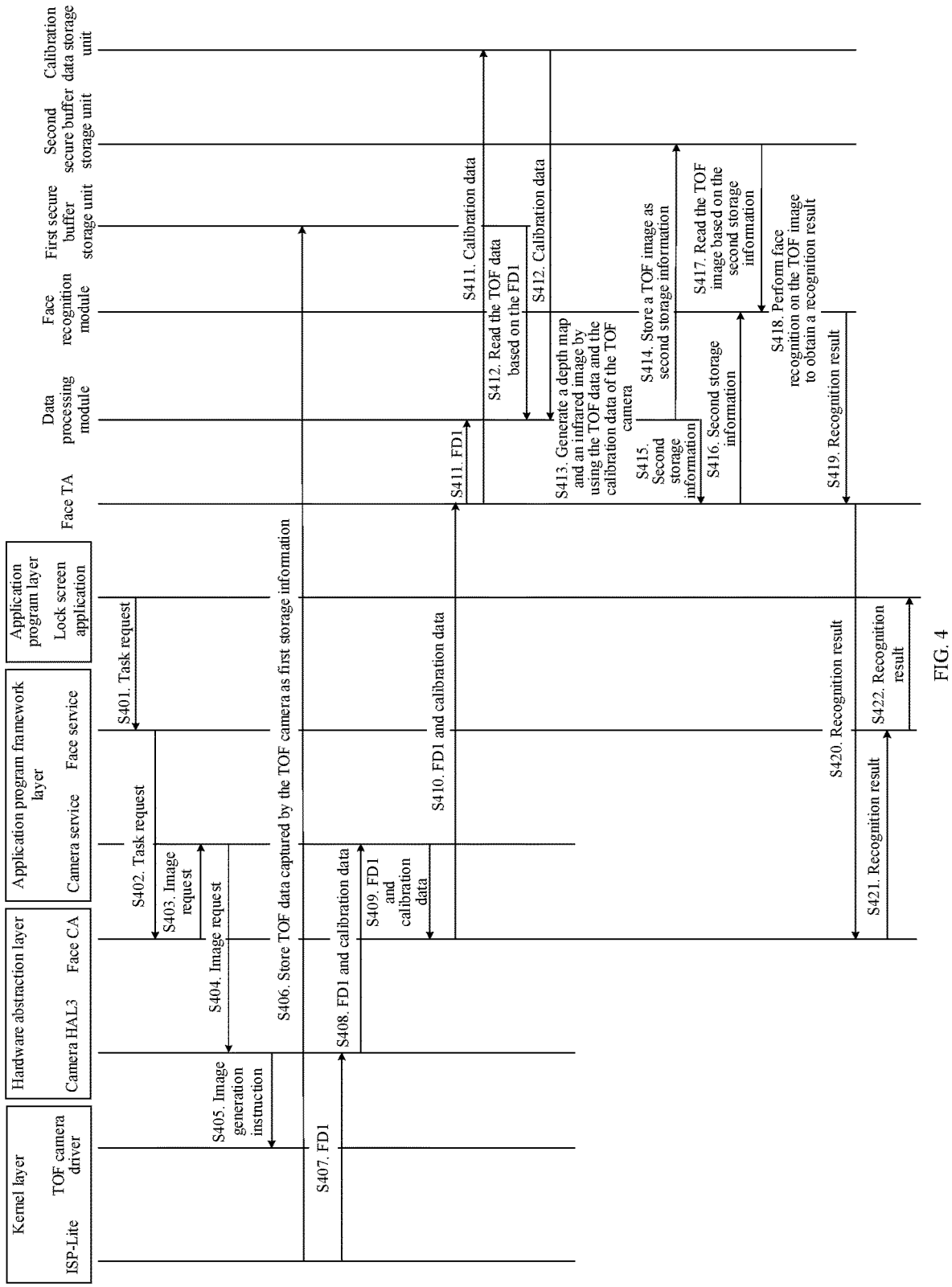
FIG. 4 is a flowchart of a face recognition method according to an embodiment of this application.

The face recognition method disclosed in this embodiment of this application is hereinafter described in detail with reference to FIG. 3. As shown in FIG. 4, the face recognition method performed by the electronic device disclosed in this embodiment of this application includes the following steps.

S401. Transmit a task request to the face service (Face service) at the application program framework layer by using an application at the application program layer.

It may be understood that the application may initiate a task and send a task request to the face service in response to at least one instruction, at least one operation of a user, at least one sensor signal, or the like, or periodically. Using the lock screen application as an example, the user presses a power key to trigger an unlock task, and an unlock application sends an unlock request to the face service.

S402. Transmit the task request to the face application client (Face Client application, Face CA) at the hardware abstraction layer by using the face service.

S403. Transmit an image request to the camera service (Camera service) at the application program framework layer by using the face CA, to respond to the task request.

S404. Transmit the image request to the camera hardware abstraction layer (Camera HAL3) at the hardware abstraction layer by using the camera service.

S405. Transmit an image generation instruction to the TOF camera driver at the kernel layer in response to the image request by using the camera HAL3, to drive the TOF camera to capture TOF data.

S406. The ISP-Lite at the kernel layer stores the received and processed TOF data into a first secure buffer (Secure Buffer) storage unit of the TEE as first storage information. The first storage information indicates a storage address.

The ISP-Lite stores the received and processed TOF data in the TEE, and this is equivalent to directly storing the TOF data from hardware (the ISP of the processor) in a secure area. Therefore, a possibility of being attacked is reduced.

S407. Transmit the first storage information to the camera HAL3 at the hardware abstraction layer by using the ISP-Lite at the kernel layer.

Because the first storage information is transmitted in the REE, to ensure security of the first storage information, optionally, the first storage information may be encrypted information, that is, a ciphertext. In this step, an example of the encrypted information is a file descriptor (File Descriptor, FD), used to describe a storage location and a read mode.

For ease of description, the ciphertext of the first storage information is abbreviated as an FD1.

S408. Transmit the FD1 and calibration data to the camera service at the application program framework layer by using the camera HAL3.

Because the calibration data needs to be used for generating a TOF image subsequently, the camera HAL3 obtains the calibration data preconfigured in the REE and transmits the calibration data together with the FD1 to the TEE.

Optionally, the camera HAL3 may obtain a part of the calibration data from a storage unit of the REE, and may obtain another part of the calibration data from the TOF camera.

S409. Transmit the FD1 and the calibration data to the face CA at the hardware abstraction layer by using the camera service.

S410. Transmit the FD1 and the calibration data to the face trusted application (Face Trusted Application, Face TA) of the TEE by using the face CA.

It may be understood that the information exchange between modules at various layers in the REE may comply with an interlayer communication protocol.

Based on the framework of the existing operating system, the storage information of the TOF data is transmitted to the TEE, and this lays a basis for processing the TOF data in the TEE. In addition, the ISP-Lite stores the received and processed TOF data in the TEE, and this ensures security of the TOF data.

S411. Transmit the FD1 to the data processing module of the TEE by using the face TA of the TEE, and store the calibration data in a calibration data storage unit of the TEE.

S412. Read the TOF data from the first secure buffer storage unit based on the FD1 by using the data processing module, and read the calibration data from the calibration data storage unit.

S413. Generate a depth map and an infrared image by using the TOF data and the calibration data of the TOF camera by using the data processing module.

S414. Store the TOF image into a second secure buffer storage unit of the TEE as second storage information by using the data processing module.

Thanks to the implementation in the TEE, the second storage information may not be encrypted.

S415. Transmit the second storage information to the face TA by using the data processing module.

S416. Transmit the second storage information to the face recognition module by using the face TA.

S417. Read the TOF image from the second secure buffer storage unit based on the second storage information by using the face recognition module.

S418. Perform face recognition on the read TOF image by using the face recognition module, to obtain a recognition result.

Specifically, the face recognition module performs face comparison on the TOF image by invoking a preconfigured face template, to obtain a comparison result, and performs anti-counterfeit recognition by using the TOF image, to obtain an anti-counterfeit result. The recognition result may be determined based on the comparison result and the anti-counterfeit result. For example, if the comparison result is comparison success, and the anti-counterfeit result is anti-counterfeit success, the recognition result is success.

As described above, because the TOF image includes the depth map and the infrared image, a large comparison threshold can be used when the infrared image is compared with the face module. Therefore, accuracy is high, and a possibility of counterfeiting of similar faces can be reduced. In addition, because both the depth map and infrared image can be used for anti-counterfeit recognition, anti-counterfeit performance is high (that is, performance of protection against plane attacks and head model mask attacks is high).

S419. Transmit the recognition result to the face TA by using the face recognition module.

S420. Transmit the recognition result to the face CA of the REE by using the face TA of the TEE.

S421. Transmit the recognition result to the face service of the application program framework layer by using the face CA.

S422. Transmit, by using the face service, the recognition result to the application that initiates the task request at the application program layer.

Using the lock screen application at the application program layer as an example, after the lock screen application initiates the unlock request, the lock screen application receives the recognition result, and performs the unlock task based on the recognition result indicating that the recognition succeeds, or performs a task of keeping the screen in the locked state based on the recognition result indicating that the recognition fails.

It may be understood that a procedure for initiating a task request and obtaining a face recognition result by other applications at the application program layer is similar. Details are not described herein again.

In the face recognition method described in this embodiment, because the TOF data is used for face recognition, security is high. Further, because face recognition based on the TOF data is implemented in the TEE, security of the TOF data, a data processing process, and a recognition process can be ensured. Therefore, security of face recognition is further improved.

Moreover, based on various layers of the Android operating system, transmission of the data storage information, the recognition result, the calibration data, and the like between the REE and the TEE is implemented with high compatibility.

It may be understood that because the calibration data is data in camera domain rather than data in face domain, in some implementations, the calibration data may be further transmitted from the camera service to the face CA via the face service.

It may be understood that after the calibration data is stored in the calibration data storage unit of the TEE, the calibration data in the calibration data storage unit of the TEE is not lost as long as the processor is not powered off. Therefore, there is no need to reload the calibration data. Certainly, the calibration data may alternatively be reloaded. This is not limited herein. Transmission of the calibration data together with the FD1 is only an implementation. Alternatively, the calibration data and the FD1 may be transmitted separately on a transmission path as described above.

It may be understood that the TOF camera captures one group of TOF data in one exposure, stops for first duration after capturing a plurality of groups of TOF data in a plurality of continuous exposures, then stops again for the first duration after a plurality of continuous exposures again, and so on. A plurality of groups of TOF data captured continuously are referred to as one frame of TOF data, and a plurality of groups of TOF data captured again after an interval of the first duration are referred to as another frame of TOF data. Without considering processing delays and transmission delays of other modules, the ISP-Lite also sequentially stores each frame of TOF data in the first secure buffer storage unit at the interval of the first duration, and also sequentially transmits storage information of each frame of TOF data to the face CA at the interval of the first duration. The face CA also sequentially transmits the storage information of each frame of TOF data to the face TA at the interval of the first duration. Therefore, the face TA also sequentially receives the storage information of each frame of TOF data at the interval of the first duration. In FIG. 4, S406 may be storing any frame of TOF data, S407 to S411 may be transmitting an FD of any frame of TOF data, and S413 to S419 are a procedure for processing this frame of TOF data. S420 to S422 may be a procedure for processing a recognition result of this frame of TOF data, or may be a procedure for processing recognition results of a plurality of frames of TOF data.

Because the TOF camera captures TOF data by emitting infrared light, it is necessary to pay attention to safety of human eyes in the capture process. In addition, because quality of the TOF image is related to accuracy of the recognition result, and an exposure parameter of the TOF camera is directly related to the quality of the TOF image, it is necessary to optimize the exposure parameter of the TOF camera.

In this embodiment of this application, the procedure shown in FIG. 4 is further improved, and based on a type of the received TOF data, the data processing module can generate different parameters for adjusting the TOF camera.

Figure 5:
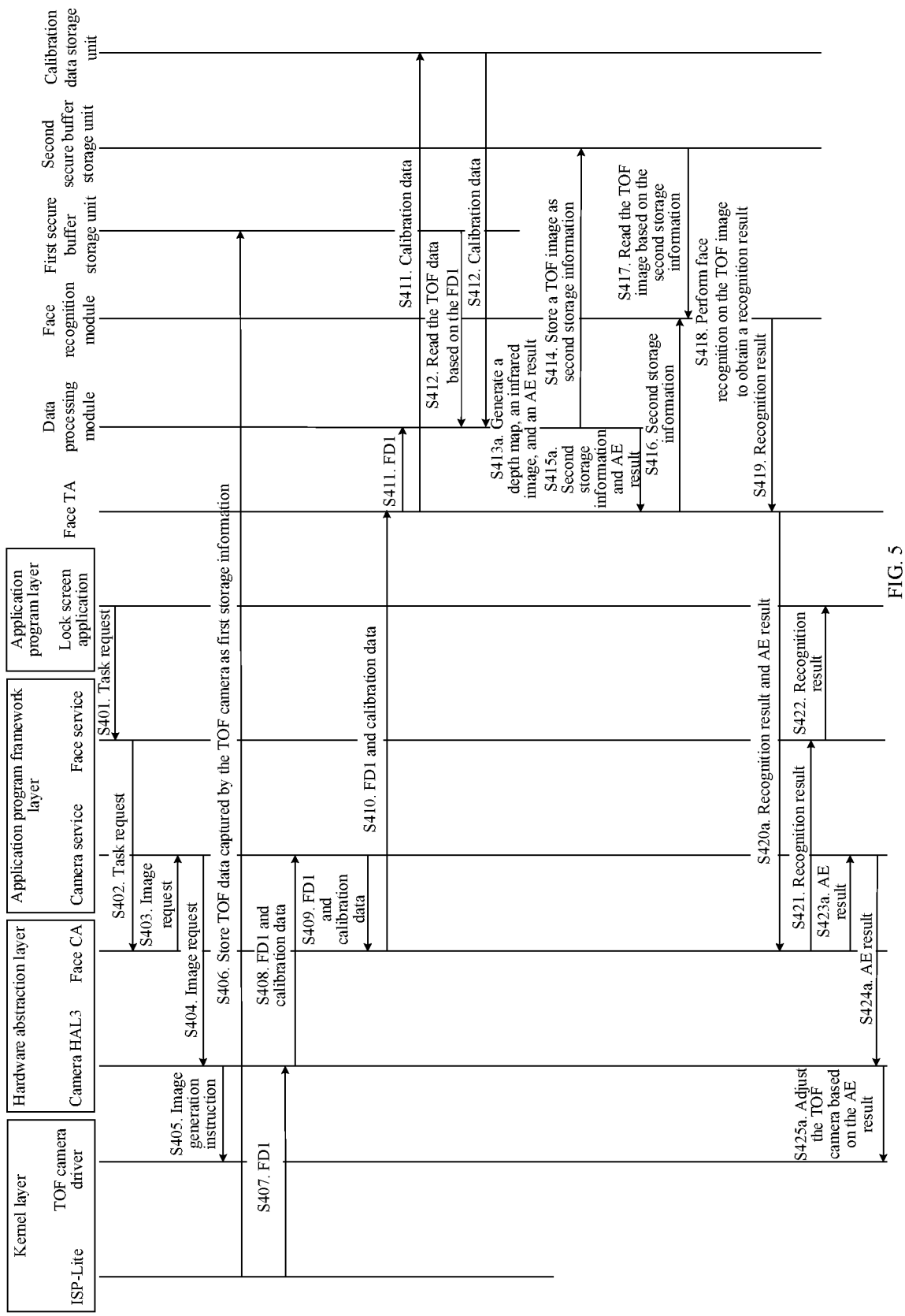
FIG. 5 is a flowchart of another face recognition method according to an embodiment of this application.

FIG. 5 shows a procedure for generating and feeding back an automatic exposure (Automatic Exposure, AE) result and controlling a camera based on the AE result. Only differences between FIG. 5 and FIG. 4 are described herein.

S413a. By using the data processing module of the TEE, generate a depth map, an infrared image, and an AE result in response to the TOF data being a face recognition frame.

In this embodiment of this application, the TOF camera divides the captured TOF data into a safety indication frame and a face recognition frame. The safety indication frame carries a human eye safety flag used to indicate whether infrared light emitted by the TOF camera is safe for human eyes. The face recognition frame is a TOF data frame used for face recognition. In some implementations, a type of the TOF data frame is indicated by at least one of a value, a character, and a character string in the TOF data frame.

In some implementations, in the TOF data captured by the TOF camera, first to fourth frames of TOF data are safety indication frames, and subsequent frames of TOF data are face recognition frames. The safety indication frame includes the human eye safety flag.

The AE result is used to adjust the exposure parameter of the TOF camera. Optionally, the AE result includes but is not limited to exposure duration and a physical gain of the TOF sensor. A manner of generating the AE result is: extracting TOF raw data (Raw Data), that is, a face region in a raw image, calculating a luminance value of the face region, and comparing the luminance value of the face region with a preconfigured target luminance value to obtain the exposure duration and the physical gain of the TOF sensor. One AE result may be generated for each frame of TOF data, or one AE result may be generated for a plurality of frames of TOF data.

S415a. Transmit the second storage information and the AE result to the face TA of the TEE by using the data processing module of the TEE.

It may be understood that when an AE result of a previous frame of TOF data is the same as a latest obtained AE result, the latest obtained AE result may not be transmitted, so that resources of the TEE are saved.

S420a. Transmit the recognition result and the AE result to the face CA at the hardware abstraction layer of the REE by using the face TA of the TEE.

S423a. Transmit the AE result to the camera service at the application program framework layer of the REE by using the face CA.

S424a. Transmit the AE result to the camera HAL3 at the hardware abstraction layer by using the camera service.

S425a. Adjust the TOF camera based on the AE result by using the camera HAL3 by using the TOF camera driver.

The camera HAL3 may send the AE result to the TOF sensor controller by using the TOF camera driver, and the TOF sensor controller controls the TOF sensor to capture the TOF data based on the AE result.

Figure 6:
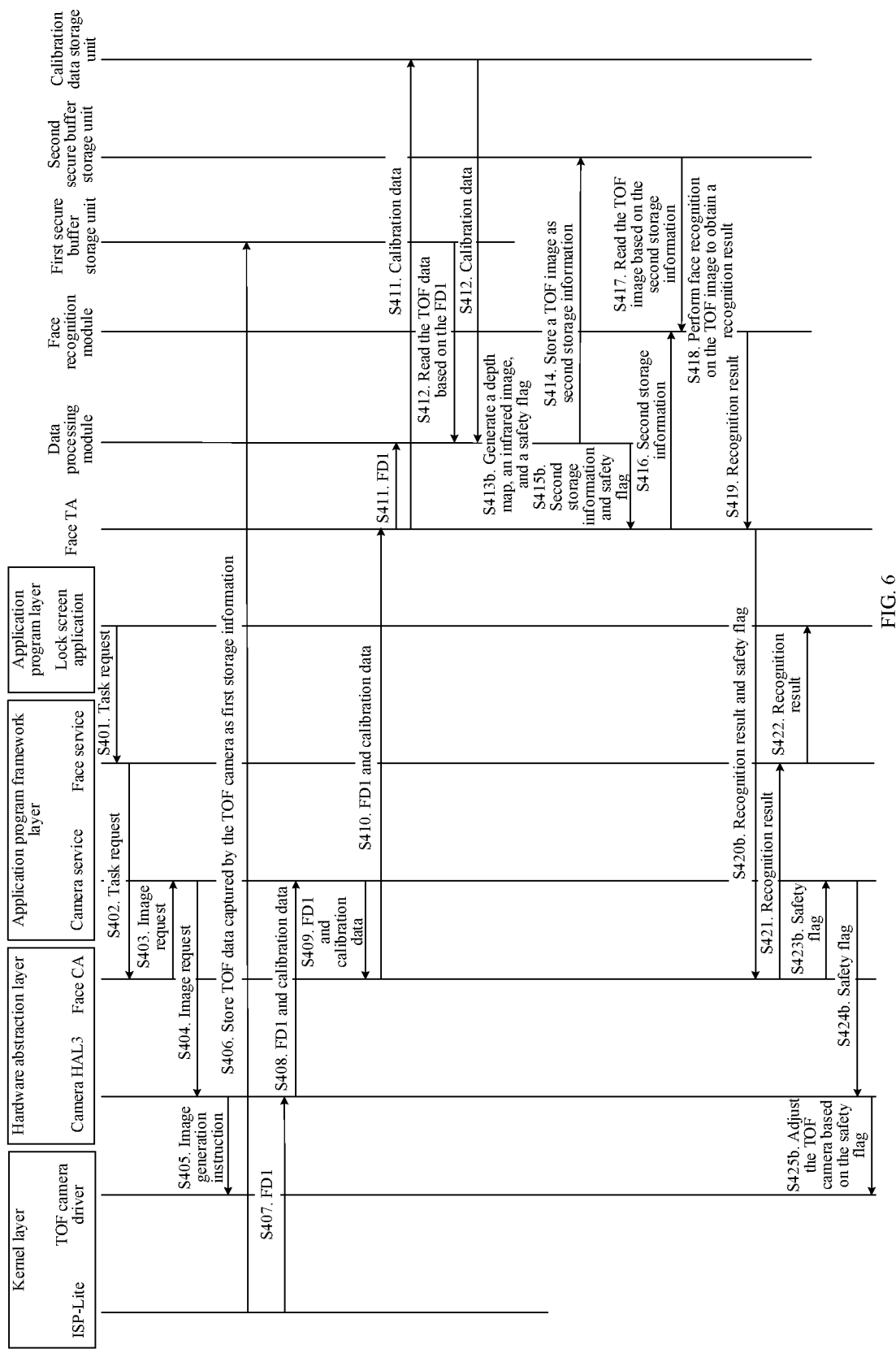
FIG. 6 is a flowchart of another face recognition method according to an embodiment of this application.

FIG. 6 shows a procedure for generating and feeding back a safety flag, and controlling a camera based on the safety flag. Only differences between FIG. 6 and FIG. 4 are described herein.

S413b. By using the data processing module of the TEE, generate a safety flag in response to the TOF data being a safety indication frame.

The safety flag is used to indicate whether the TOF light source is safe for human eyes.

Optionally, a manner of generating the safety flag is: after receiving a TOF data frame (that is, the safety indication frame) carrying a human eye safety flag, extracting the human eye safety flag, determining, based on the extracted human eye flag, whether the human eyes are safe, and generating the safety flag. If the human eye safety flag indicates safety, the safety flag indicating safety is obtained. If the human eye safety flag indicates non safety, the safety flag indicating non safety is obtained.

S415b. Transmit the second storage information and the safety flag to the face TA of the TEE by using the data processing module of the TEE.

Generally, in a process from starting capture to terminating capture by the TOF camera, human eye safety flags carried in various safety indication frames are the same. For example, human eye safety flags in a first safety indication frame to a fourth safety indication frame all indicate safety for human eyes or all indicate non safety for human eyes. In this case, a plurality of safety flags that are obtained are the same. Therefore, only one safety flag may be transmitted, so that resources of the TEE are saved.

However, it cannot be ruled out that in some cases, human eye flags in a plurality of safety indication frames are different. Therefore, it is also possible to transmit only a last safety flag, that is, a safety flag determined based on a last received safety indication frame, so that resources of the TEE are saved.

S420b. Transmit the recognition result and the safety flag to the face CA at the hardware abstraction layer of the REE by using the face TA of the TEE.

S423b. Transmit the safety flag to the camera service at the application program framework layer of the REE by using the face CA.

S424b. Transmit the safety flag to the camera HAL3 at the hardware abstraction layer by using the camera service.

S425b. Adjust the TOF camera based on the safety flag by using the camera HAL3 by using the TOF camera driver.

Adjusting the TOF camera includes but is not limited to: if the safety flag indicates non safety for human eyes, turning off the TOF camera, or reducing emission intensity of the TOF light source. If the safety flag indicates safety for human eyes, a TOF data frame is captured and identified as a TOF data frame used for face recognition (that is, a face recognition frame).

Based on FIG. 2, optionally, the camera HAL3 may send a turn-off instruction to the TOF sensor controller by using the TOF camera driver, to turn off the TOF camera.

In summary, after the electronic device obtains TOF raw data by using the processor, the TOF raw data is processed into a TOF image in the TEE, and the TOF image is used for face recognition, so that security of face recognition is higher.

In addition, with reference to various layers of the Android system, transmission of the storage information of the TOF data to the TEE is implemented. This not only lays a basis for processing in the TEE, but also achieves compatibility with the Android system.

It can be seen that even if the processor of the electronic device does not support generation of TOF images, the foregoing framework and procedure described in this embodiment can achieve an objective of using the TOF data to implement face recognition, thereby improving security.

Further, it is also possible to implement human eye safety protection and exposure parameter adjustment, so that the electronic device has better performance on a basis of improving the security of face recognition.

It may be understood that although the Android operating system is used as an example for description in FIG. 4 to FIG. 6, the face recognition method described in this embodiment of this application is not limited to the Android operating system. For example, running of the TEE is not limited to the Android operating system. Therefore, functions of each application, module, and unit in the TEE can also be implemented in other operating systems. Running of the REE is not limited to the Android operating system either. Therefore, the paths for transmitting the TOF data and calibration data to the TEE, the path for transmitting the task request, the path for feeding back the recognition result, and the like can be adjusted to adapt to different operating systems, as long as the TOF data and calibration data can be transmitted from the REE to the TEE, and the task request triggers capture of the TOF data, and the recognition result is used to perform the task.

The inventor finds that, in addition to security, there is room for improving accuracy and an execution speed of face recognition, that is, there are also the following problems in face recognition:

The recognition result is inaccurate due to low image quality. Due to impact of ambient light, data captured by the camera may have quality defects such as an overexposure, a blur, and insufficient luminance, but face recognition is based on the data captured by the camera. Therefore, a problem that a comparison result is incorrect may occur. For example, the person is originally the same, but the face recognition result is failure.

An excessive delay leads to poor user experience. With reference to the scenario shown in FIG. 1a, if the speed of face recognition is excessively low and the user needs to wait for an excessively long time, the user's comfort level in use is reduced. Poor image quality is often a cause of the excessively long delay.

Improving the image quality and improving the execution speed are a pair of contradictions. To improve the image quality, it is necessary to perform iterative processing, noise reduction processing, and the like on the image, so that the image converges. The more the processing means, the lower the processing speed.

During research, the inventor further finds that TOF imaging has the following characteristics:

(1) The TOF data captured by the TOF camera is less affected by ambient light. Therefore, in most scenarios, quality of a first frame of TOF data (such as a first face recognition frame) captured by the TOF camera can satisfy a recognition accuracy requirement. Therefore, in most scenarios, a face recognition result with high accuracy can be obtained by using the first frame of TOF data.

Still using a face unlocking service as an example, it is assumed that a face trying to unlock is a face already recorded in the electronic device, that is, the face trying to unlock can unlock the screen. In this case, the first frame of TOF data can be used to implement unlocking.

(2) When a feedback adjustment mechanism (the feedback adjustment mechanism refers to using earlier captured data and the calibration data of the camera to adjust an exposure parameter of subsequently captured data to improve the image quality) takes effect, convergence of TOF data (convergence refers to no longer changing) is fast, and the TOF data converges in about three or four frames.

Continuing from the foregoing example, assuming that unlocking is not implemented by using the captured first frame of TOF data, when the exposure parameter is adjusted by using the feedback adjustment mechanism, the captured third or fourth frame of TOF data converges (that is, even if the exposure parameter is adjusted later, the TOF data no longer changes), unlocking can be implemented by using the captured third or fourth frame of TOF data.

Based on the foregoing characteristics of TOF imaging, under a prerequisite of using TOF data for face recognition to improve security, a possibility is provided to take both accuracy and the speed into account.

In the following embodiment, based on the foregoing manner of sequentially storing each frame of TOF data in the TEE at the interval of the first duration and transmitting the storage information of each frame of TOF data to the TEE, and with reference to the foregoing characteristics of TOF imaging, an objective of obtaining the recognition result accurately and quickly is achieved through invoking of the data processing module and the face recognition module by using the face TA.

Figure 7:
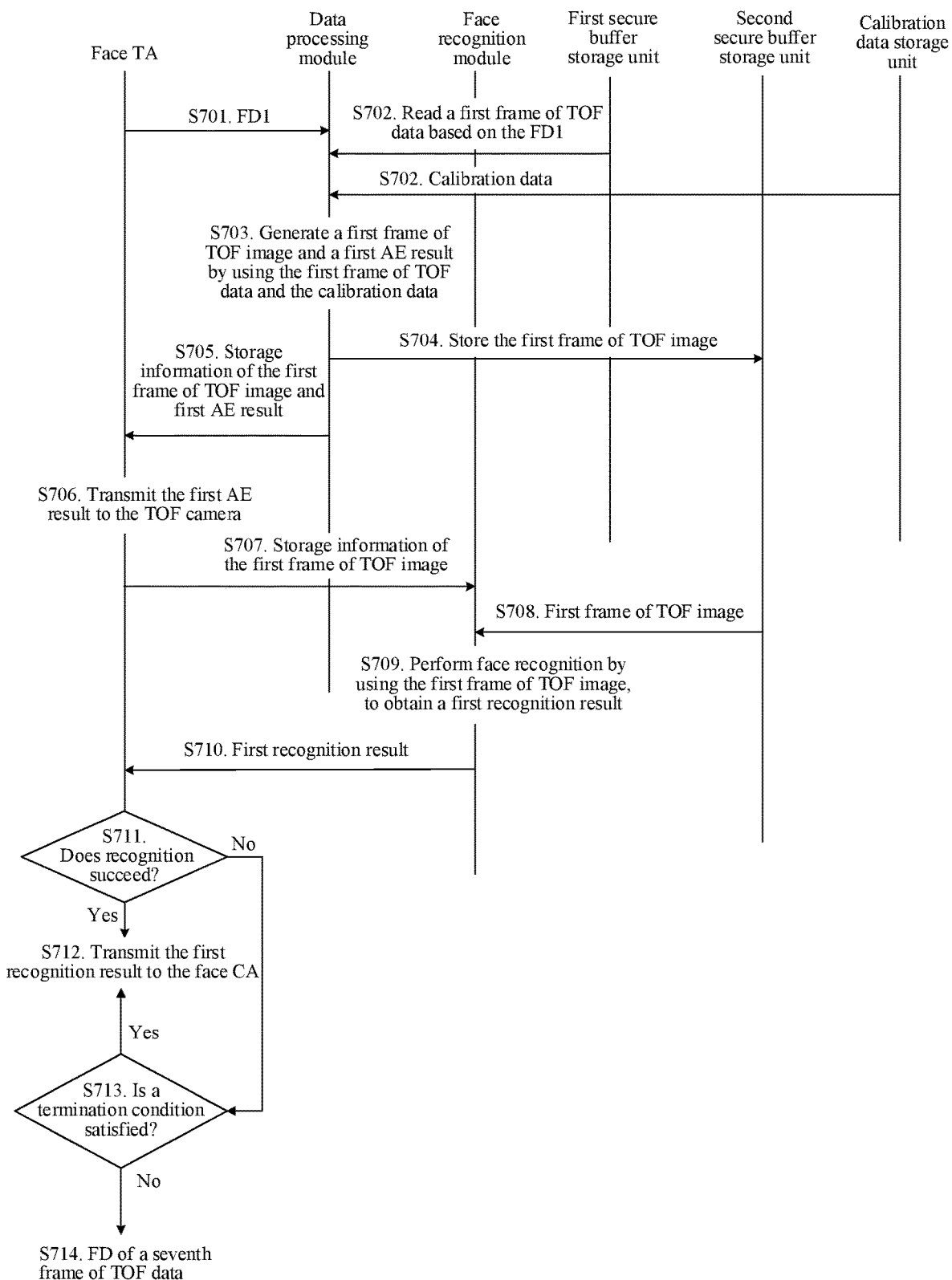
FIG. 7 is a flowchart of a data processing method according to an embodiment of this application.

FIG. 7 is a data processing method disclosed in an embodiment of this application. In comparison with FIG. 4, FIG. 5, or FIG. 6, an improvement lies in applications and modules in the TEE. The functions and data transmission modes of the modules in the REE are the same as those shown in FIG. 4, FIG. 5 or FIG. 6, and are not described herein again. Starting from receiving an FD1 and calibration data by the face TA, the procedure shown in FIG. 7 includes the following steps.

S701. After receiving the FD (abbreviated as the FD1) of the first frame of TOF data, the face TA transmits the FD1 to the data processing module.

In some implementations, the first frame of TOF data is a first frame of TOF data captured by the TOF camera driven by the TOF camera driver controlled by the camera HAL3 in response to an image request.

In other implementations, TOF data frames captured by the TOF camera are respectively identified as a safety indication frame and a face recognition frame. The safety indication frame carries a human eye safety flag used to indicate whether infrared light emitted by the TOF camera is safe for human eyes. The face recognition frame is a TOF data frame used for face recognition. In this case, the first frame of TOF data in this step is a first face recognition frame.

S702. The data processing module reads the first frame of TOF data from the first secure buffer storage unit based on the FD1, and reads the calibration data from the calibration data storage unit.

In this embodiment, it is assumed that the calibration data has been stored in the calibration data storage unit.

S703. The data processing module generates a TOF image by using the first frame of TOF data and the calibration data and generates an automatic exposure (Automatic Exposure, AE) result.

As described above, the TOF image includes a depth map and an infrared image.

The AE result is used to adjust an exposure parameter for capturing TOF data by the TOF camera. The AE result includes but is not limited to exposure duration and a physical gain of the TOF sensor. A manner of generating the AE result is: extracting a face region in a TOF raw image (Raw Data), calculating a luminance value of the face region, and comparing the luminance value of the face region with a preconfigured target luminance value to obtain the exposure duration and the physical gain of the TOF sensor.

For ease of description, the TOF image obtained by processing the first frame of TOF data is referred to as a first frame of TOF image. The AE result obtained from the first frame of TOF data is referred to as a first AE result.

S704. The data processing module stores the first frame of TOF image in the second secure buffer storage unit.

S705. The data processing module transmits storage information of the first frame of TOF image and the first AE result to the face TA.

It may be understood that because the storage information of the first frame of TOF image is transmitted only in the TEE, the storage information can be transmitted in a plain text form.

S706. The face TA transmits the first AE result to the TOF camera.

With reference to the example shown in FIG. 4, FIG. 5, or FIG. 6, a path for transmitting the first AE result to the TOF camera is: the face TA, the face CA, the camera service, the camera HAL3, and the TOF sensor controller of the TOF camera, and then the TOF sensor controller uses the first AE result to adjust parameters of the TOF camera, including but not limited to exposure duration.

It may be understood that a TOF data frame on which the first AE result can act is related to duration of processing the TOF data by the processor. Assuming that a capture interval of the TOF camera is 30 ms and that a total time taken by the processor to generate the first TOF image and the first AE result is also 30 ms, the first AE result can earliest act on a third frame of TOF data captured by the TOF camera.

Generating and transmitting the AE result are optional steps. A purpose of the steps is to improve quality of subsequently captured TOF data and further obtain a TOF image with better quality and a more accurate recognition result.

The first frame of TOF data may be captured by using a preconfigured fixed exposure parameter.

S707. The face TA transmits the storage information of the first frame of TOF image to the face recognition module, to trigger the face recognition module to perform face recognition.

It may be understood that an execution order of S706 and S707 is not limited.

S708. The face recognition module reads the first frame of TOF image from the second secure buffer storage unit by using the storage information of the first frame of TOF image.

S709. The face recognition module performs face recognition by using the first frame of TOF image, to obtain a first recognition result.

With reference to FIG. 3, the face recognition module invokes a face template to perform face comparison on the first frame of TOF image. In addition to face comparison, anti-counterfeit recognition may also be performed by using the depth map and the infrared image. Therefore, face recognition includes face comparison and anti-counterfeit recognition. If both face comparison and anti-counterfeit recognition succeed, the recognition result of face recognition indicates success.

S710. The face recognition module transmits the first recognition result to the face TA.

S711. The face TA determines whether the first recognition result indicates that the recognition succeeds, and if yes, performs S712, or if no, performs S713.

S712. The face TA transmits the first recognition result to the face CA.

As described above, the face CA transmits the first recognition result to a task initiator, for example, an unlock application.

S713. The face TA determines whether a termination condition is satisfied, and if yes, performs S712, or if no, performs S714.

The termination condition may be preset. In this step, the termination condition includes: duration of performing the task reaches a second duration threshold. An example of the second duration threshold is 5 seconds. The termination condition is optional, and it is not necessary to determine whether the termination condition is satisfied. When the first recognition result indicates that the recognition fails, S714 is performed.

It can be seen that a purpose of setting the termination condition is to avoid unnecessary time consumption in the task execution process: If face recognition still fails after certain duration, it can be basically determined that the face recognition result is failure. For example, a face trying to unlock is not prestored in the electronic device. Therefore, there is no need to continue the face recognition. Instead, the face recognition result should be fed back to the task initiator as soon as possible to reduce a task execution delay and ensure good user experience.

S714. The face TA receives one frame of TOF data from the TOF camera again.

Still assuming that a capture interval of the TOF camera is 30 ms and that a time taken to generate the first frame of TOF image and the first AE result is also 30 ms, a frame of TOF data received from the TOF camera again is a seventh frame of TOF data captured by the TOF camera.

It may be understood that because the first AE can earliest act on the third frame of TOF data, the seventh frame of TOF data is a TOF data frame captured after the exposure parameter is adjusted by using the first AE result.

For a subsequent procedure to be performed by the face TA after a TOF data frame is received again, refer to S701 to S714. To be specific, the first frame of TOF data as a processing object in S701 to S714 is replaced with a frame of TOF data received again, such as the seventh frame of TOF data, and a processing result of the first frame of TOF data is adaptively replaced with a processing result of the frame of TOF data received again (for example, the first frame of TOF image is replaced with a second frame of TOF image). Details are not described herein again.

There are at least the following differences between the procedure shown in FIG. 7 and an existing face recognition procedure: An image data processing procedure in the prior art includes iteratively processing image data to obtain converged image data, and its purpose is to obtain an image whose quality satisfies a recognition accuracy requirement.

Using RGB data as an example, because the RGB data is easily affected by ambient light, quality of a first frame of RGB data captured usually cannot satisfy the recognition accuracy requirement. Therefore, iterative processing needs to be performed on the RGB data to obtain converged RGB data, and then face recognition is performed by using the converged RGB data, to ensure accuracy of a recognition result. Generally, depending on different iterative algorithms, the RGB data can converge in about 10 frames quickly, or converge in 30 to 40 frames slowly. Therefore, a consensus of persons skilled in the art is that the quality of the first frame of RGB data is probably poor due to impact of ambient light, and it is meaningless to directly use the first frame of RGB data for face recognition.

In this embodiment, based on the foregoing TOF imaging principle (1), in most scenarios, the first frame of TOF data converges. It can be learned that an accurate recognition result can be probably obtained by using the first frame of TOF data. Therefore, after the electronic device captures the first frame of TOF data, the face recognition result is obtained by using the first frame of TOF image generated by the first frame of TOF data. Therefore, a shorter processing delay can be achieved while high accuracy of the recognition result is ensured. In other words, based on the foregoing TOF imaging principle, the step of iterating the image data to obtain converged image data is omitted, in exchange for an improvement of the processing speed of the image data.

Further, during research, the inventor finds that an interval of capturing TOF data by the TOF camera and duration of generating a TOF image by a processor are usually both 30 ms, and that duration of face recognition is usually 150 ms. Therefore, duration of using the TOF data to obtain a recognition result is: 30 ms+150 ms=180 ms. When other conditions are the same, this value can indicate that the method described in this embodiment can make the user feel acceleration of unlocking. Therefore, user experience can be improved.

Because a frame of TOF data received again is captured by using the exposure parameter determined based on the first AE result, a probability of convergence is greater. Therefore, even if the first frame of TOF data is not recognized successfully due to a quality problem, the frame of TOF data received again can be recognized successfully, and time consumption is: (30 ms+150 ms)*2=360 ms. This is still advantageous in comparison with duration of RGB data convergence.

A more specific example of a scenario to which this embodiment is applied is as follows:

Limited by hardware conditions of the mobile phone, only one processor (the secure area processor 21 shown in FIG. 2) can be used to implement face recognition.

Assuming that the face trying to unlock is a face already recorded in the electronic device, after the user aligns the face with the screen of the mobile phone, the TOF camera captures TOF data at intervals of 30 ms and transmits the TOF data to the processor. After receiving a first frame of TOF data, the processor processes the first frame of TOF data into a first frame of depth map and a first frame of infrared image according to the procedure described in this embodiment, and obtains a first recognition result by using the first frame of depth map and the first frame of infrared image. In the process in which the processor generates the first frame of TOF image and calculates the recognition result, because the processor is occupied, although the TOF camera is still transmitting TOF data frames to the processor, the processor can no longer receive subsequent TOF data frames. In other words, TOF data frames other than the received first frame of TOF data are discarded.

It can be seen that this embodiment does not take a TOF data iteration process into account, and just fits the foregoing scenario of one processor. In other words, in a scenario in which only one processor is used for TOF data processing and face recognition, if both recognition processing and TOF data iteration are to be implemented to wait for convergence of the TOF data, the processor must perform serial processing, and therefore, an excessively long time is consumed. In the method described in this embodiment, because no TOF data iteration step is performed, time consumption can be reduced. In addition, because the TOF data converges in the first frame in most cases, in the case of reducing time consumption of face recognition, it can also be ensured that the recognition result is accurate.

In summary, based on a feature that a probability of TOF data convergence in the first frame is high, the data processing method described in this embodiment ensures that face recognition can be performed accurately and quickly in most cases. In addition, because security of face recognition performed by using the TOF data is high, an objective of secure, accurate, and fast face recognition can be achieved.

During research, the inventor further finds that in an outdoor scenario, because natural light includes light whose wavelength is close to that of the infrared light emitted by the TOF light source, the first frame of TOF data captured may be overexposed. In this case, the quality of the first frame of TOF data is not sufficient for obtaining an accurate recognition result. As in the foregoing example, when unlocking cannot be performed by using the first frame, a required unlocking delay is at least 360 ms, and there is room for further reducing this delay.

Figure 8:
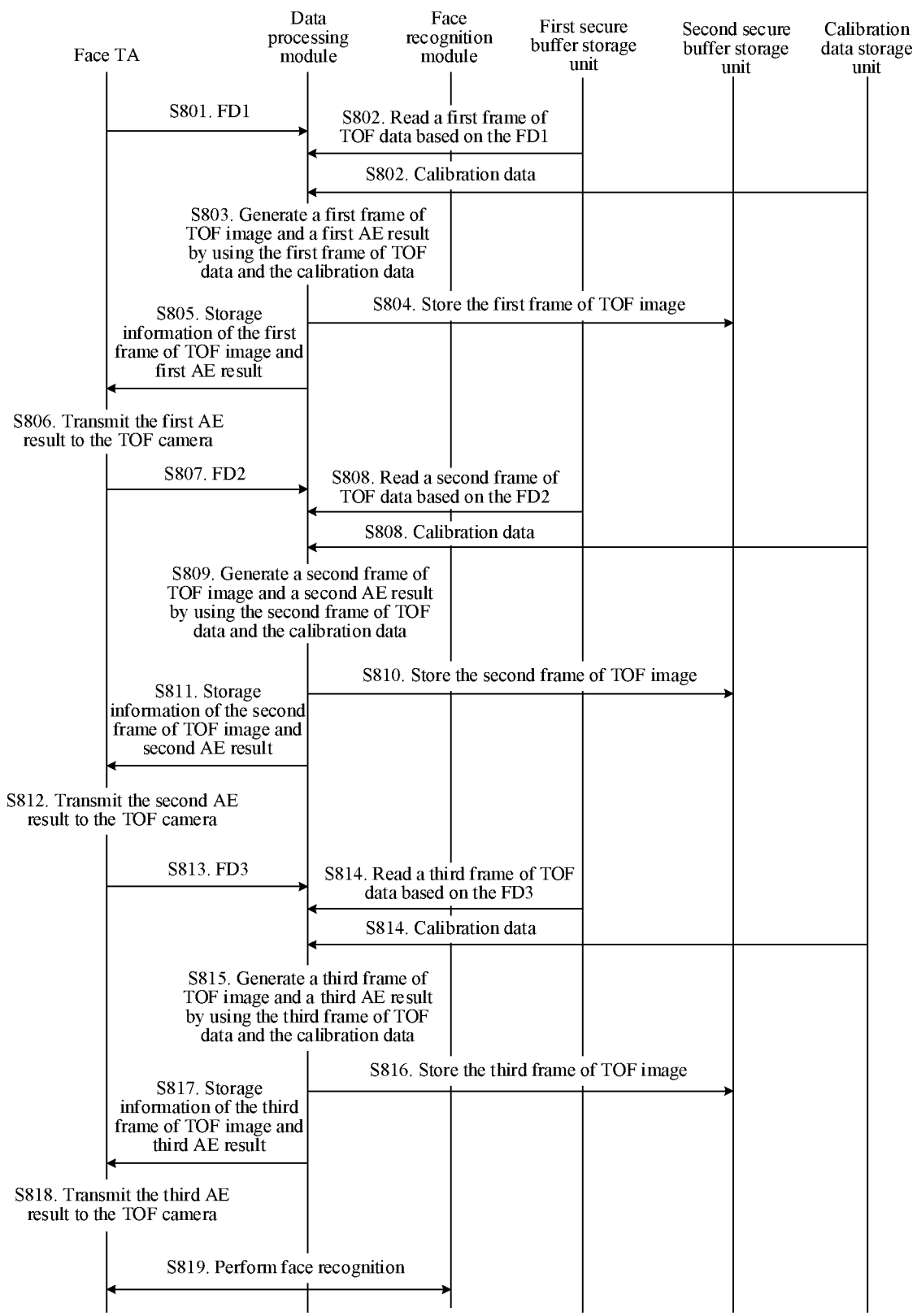
FIG. 8 is a flowchart of another data processing method according to an embodiment of this application.

An embodiment of this application discloses another data processing method, as shown in FIG. 8.

S801 to S806 are the same as S701 to S706. For details, refer to FIG. 8. Details are not described herein again.

S807 to S812 are a procedure for processing a second frame of TOF data after storage information of the second frame of TOF data is received. The procedure is the same as the procedure for processing the first frame of TOF data. For details, refer to FIG. 8. Details are not described herein again.

It may be understood that the second frame of TOF data may be a TOF data frame captured by the TOF camera by using an exposure parameter adjusted based on the first AE result, where the exposure parameter may be the same as an exposure parameter of the first frame of TOF data. A specific case depends on an interval at which the TOF camera captures a TOF data frame (such as the foregoing interval of the first duration) and duration from receiving the TOF data frame to feeding back an AE result by the processor.

Assuming that an interval of capturing and transmitting data by the TOF camera is 30 ms and that duration of processing the TOF data into a TOF image and obtaining the AE result by the processor is also 30 ms, the first AE result cannot act on capture of the second frame of TOF data.

S813 to S818 are a procedure for processing a third frame of TOF data after storage information of the third frame of TOF data is received. The procedure is the same as the procedure for processing the first frame of TOF data. For details, refer to FIG. 8. Details are not described herein again.

As can be seen from the foregoing procedure, a difference between this embodiment and the foregoing embodiment lies in receiving and processing the first three frames of TOF data.

S819. The face TA invokes the face recognition module to perform face recognition.

Figure 9:
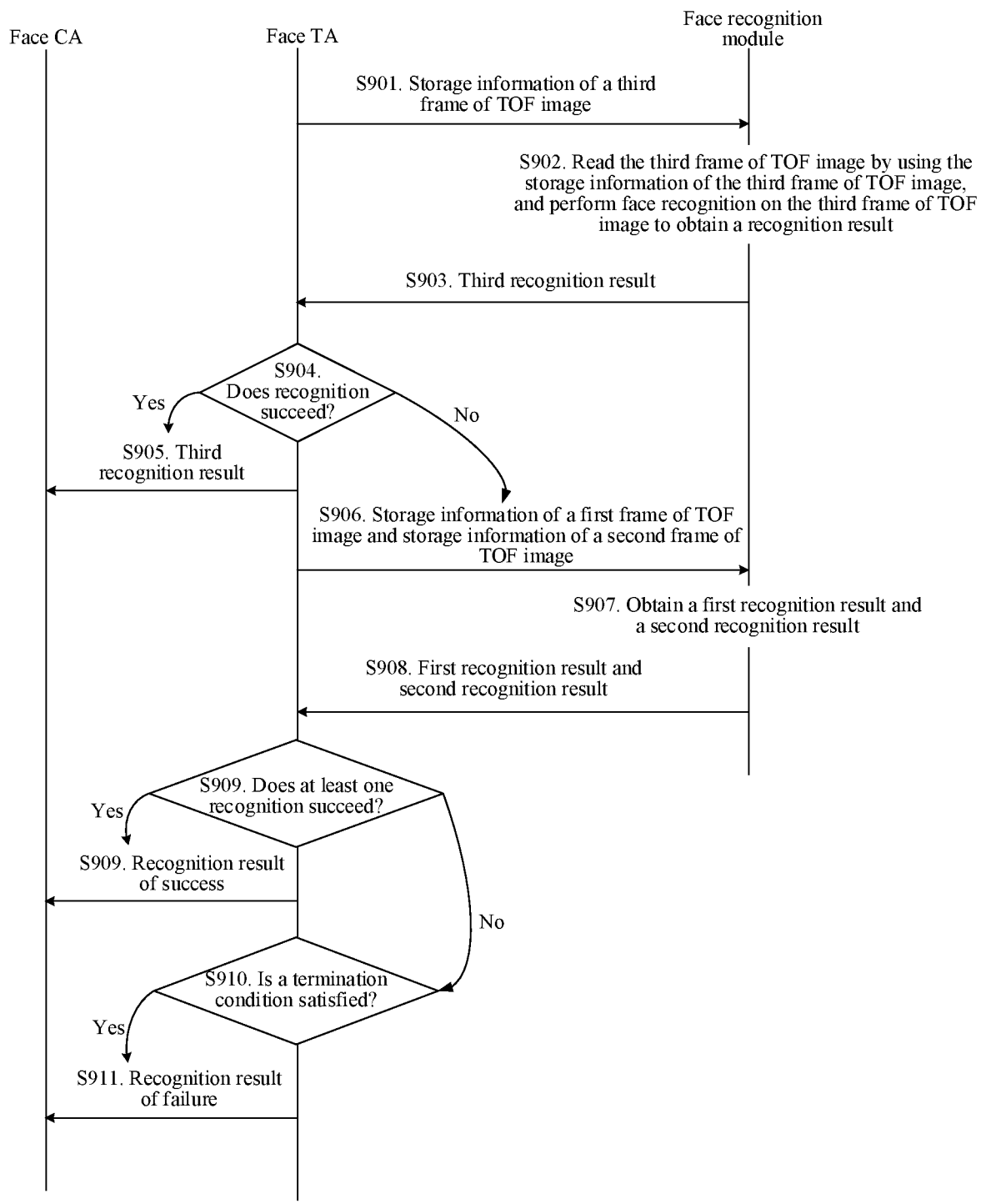
FIG. 9 is a flowchart of a specific implementation of S819 in FIG. 8.

An optional implementation of S819 is shown in FIG. 9:

S901. The face TA transmits storage information of a third frame of TOF image to the face recognition module.

S902. After reading the third frame of TOF image by using the storage information of the third frame of TOF image, the face recognition module performs face recognition by using the third frame of TOF image, to obtain a recognition result of the third frame of TOF image.

It may be understood that the face recognition module reads the third frame of TOF image from the second secure buffer storage unit. Details are not described in FIG. 9 again.

For ease of distinguishing, the recognition result of the third frame of image is referred to as a third recognition result.

S903. The face recognition module transmits the third recognition result to the face TA.

S904. The face TA determines whether the third recognition result indicates that the recognition succeeds, and if yes, performs S905, or if no, performs S906.

S905. The face TA transmits the third recognition result to the face CA.

Because the third frame of TOF data is most probably data captured after the exposure parameter is adjusted by using the AE result, quality is most probably the best. Therefore, first using the third frame of TOF image for face recognition can further reduce time consumption.

S906. The face TA transmits storage information of a first frame of TOF image and storage information of a second frame of TOF image to the face recognition module.

S907. The face recognition module obtains a first recognition result and a second recognition result.

The first recognition result is a result of performing face recognition on the first frame of TOF image. The second recognition result is a result of performing face recognition on the second frame of TOF image.

It may be understood that an order of performing face recognition by using the first frame of TOF image and performing face recognition by using the second frame of TOF image is not limited.

S908. The face recognition module transmits the first recognition result and the second recognition result to the face TA.

S909. If at least one of the first recognition result and the second recognition result indicates success, the face TA transmits the recognition result of recognition success to the TOF CA.

S910. If both the first recognition result and the second recognition result indicate that the recognition fails, the face TA determines whether a termination condition is satisfied, and if yes, performs S911, or if no, performs the procedure shown in FIG. 8 again.

For the definition of the termination condition, refer to the foregoing embodiment. In this step, a duration threshold in the termination condition may be shorter than the duration threshold in the termination condition in the foregoing embodiment, because in this embodiment, a plurality of frames of TOF data have been captured and processed. In this step, an example of the duration threshold is 3 seconds.

It should be noted that when the procedure shown in FIG. 8 is performed again, for "an $N^{th}$ frame of TOF data", N is no longer a sequence of data frames captured by the TOF camera, where N=1, 2, 3, which refers to an order of TOF data frames received when the processor currently performs the procedure shown in FIG. 8. For example, when S801 is performed again, the TOF camera may capture a ninth frame of TOF data, but when the procedure shown in FIG. 8 is currently performed, the processor receives the first frame of TOF data. Therefore, the "first frame of TOF data" in S801 refers to the first frame of TOF data in the currently performed procedure shown in FIG. 8, rather than the first frame of TOF data actually captured by the TOF camera.

S911. The face TA transmits the recognition result of recognition failure to the TOF CA.

It may be understood that, in addition to what is shown in FIG. 9, S819 can also be implemented in other manners. For example, face recognition is performed by using the first frame of TOF image, the second frame of TOF image, and the third frame of TOF image in sequence, or recognition is performed by using only the third frame of TOF image, and if the recognition result indicates that the recognition fails, the procedure shown in FIG. 8 is performed again to save resources such as memory. Other implementations are not listed one by one herein. In the method of this embodiment, based on the foregoing TOF imaging principle (2) that the TOF data converges in two or three frames, three frames of TOF data are continuously processed to obtain a recognition result. For an outdoor scenario, a processing delay shorter than that in the foregoing embodiment can be obtained.

An example of an application scenario of the procedure shown in FIG. 8 is as follows:

Assuming that a face trying to unlock is a face already recorded in the electronic device, the user aligns the face with the screen in an outdoor environment, the TOF camera captures TOF data at an interval of 30 ms and transmits the TOF data to the processor, and after receiving the first frame of TOF data, the processor processes the received TOF data to generate the first TOF image and the first AE result.

Because the electronic device is in the outdoor environment, there is a high probability that the electronic device is not unlocked based on the first frame of TOF data. Therefore, the processor does not perform face recognition after generating the first TOF image and transmitting the first AE result, but continues to receive and process a TOF data frame. Because the duration of generating the TOF image and the AE result is 30 ms, which is equivalent to the duration of capturing and transmitting TOF data by the TOF camera, after processing the first frame of TOF data, the processor can continue to receive and process the second frame of TOF data. After processing the second frame of TOF data, the processor can continue to receive and process the third frame of TOF data.

Based on the foregoing duration, the first AE result generated based on the first frame of TOF data can earliest act on the third frame of TOF data. Therefore, unlocking is probably performed successfully by using the third frame of TOF data.

Shortest duration required for obtaining the recognition result by using the third frame of TOF data is: 30 ms*3+150 ms. In comparison with the foregoing embodiment, when unlocking by using the first frame of TOF data fails, the frame for successful unlocking changes from the seventh frame to the third frame. Therefore, the speed can be increased, and the delay is reduced.

It can be seen that, if unlocking can be performed by using the first frame of TOF data, in comparison with the foregoing embodiment, duration of processing two pieces of TOF data (to generate the TOF image and the AE result) is added, that is, 60 ms. Therefore, the data processing method described in this embodiment improves the unlocking speed in an outdoor strong light scenario by sacrificing the unlocking speed based on the first frame of TOF data.

It may be understood that, because the first AE result acts on the third frame of TOF data, optionally, in FIG. 8, the second frame of TOF data and the AE result of the second frame of TOF data may not be processed, that is, S807 to S812 are not performed, to save resources. Correspondingly, the recognition result is obtained without participation of the second frame of TOF image.

In summary, the second frame of TOF data may be received only without being processed. Alternatively, the second frame of TOF data may be discarded without being received.

In this embodiment, an example in which three frames of TOF data are continuously processed in one procedure is used. Actually, a quantity of continuously processed TOF data frames is related to time consumption of generating and feeding back an AE result and the interval of the first duration of capturing a data frame by the TOF camera.

Based on the scenarios to which the foregoing embodiments are respectively applicable, it may be understood that the foregoing method described in FIG. 7 or FIG. 8 may be used preferably with a determining condition. Based on the software framework shown in FIG. 3, another data processing method disclosed in an embodiment of this application includes the following steps.

1. The face CA obtains an intensity value of ambient light.

Based on the software framework shown in FIG. 3, after receiving a task request, the face CA may further send a light intensity request to obtain the intensity value of the ambient light. It may be understood that the light intensity request may be sent to a corresponding driver at the kernel layer by using corresponding modules at the application program framework layer and the hardware abstraction layer, and that the corresponding driver at the kernel layer drives a light sensor to sense the intensity value of the ambient light and feed back the intensity value to the face CA.

2. The face CA transmits the intensity value of the ambient light to the face TA.

3. The face TA determines whether the intensity value of the ambient light is greater than a preset first intensity threshold, and if yes, performs the data processing procedure shown in FIG. 7, or if no, performs the data processing procedure shown in FIG. 8.

In this embodiment, an environment in which the electronic device is located is determined by using the intensity value of the light, and a face recognition result is obtained by using a procedure that is more adaptive to the environment, so that accuracy and a speed of obtaining the face recognition result can be maximized on a basis of improving security.

During research, the inventor further finds that, regardless of an outdoor scenario or an indoor scenario, when the ambient light is extremely strong and a sensor of the TOF camera faces a strong light source, quality of a first frame of TOF data cannot support obtaining an accurate face recognition result. Therefore, the TOF data needs to converge, so that duration of face recognition is increased.

Figure 1B:
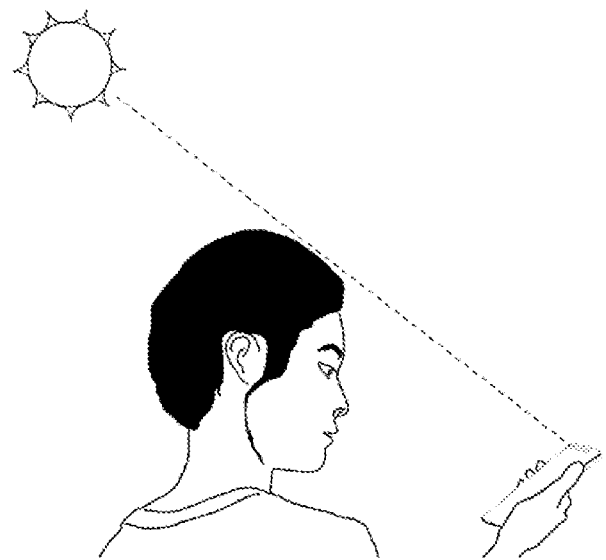
FIG. 1b is an exemplary diagram of a scenario of face recognition performed by using an electronic device under strong light.

For example, in FIG. 1b, a user is located outdoors where sunlight is extremely strong, and the user faces away from the sun. In this case, the user aligns the front-facing camera of the mobile phone with the face, expecting to perform face unlocking (assuming that the face of the user is already stored in the mobile phone as a face module). It takes more time to unlock than in an indoor environment.

In view of the foregoing problem, an embodiment of this application provides a data obtaining method to obtain a higher-quality first frame of TOF data, so as to improve accuracy of a recognition result of the first frame of TOF data while using the TOF data for face recognition to obtain higher security, thereby further quickly completing face recognition.

Figure 10:
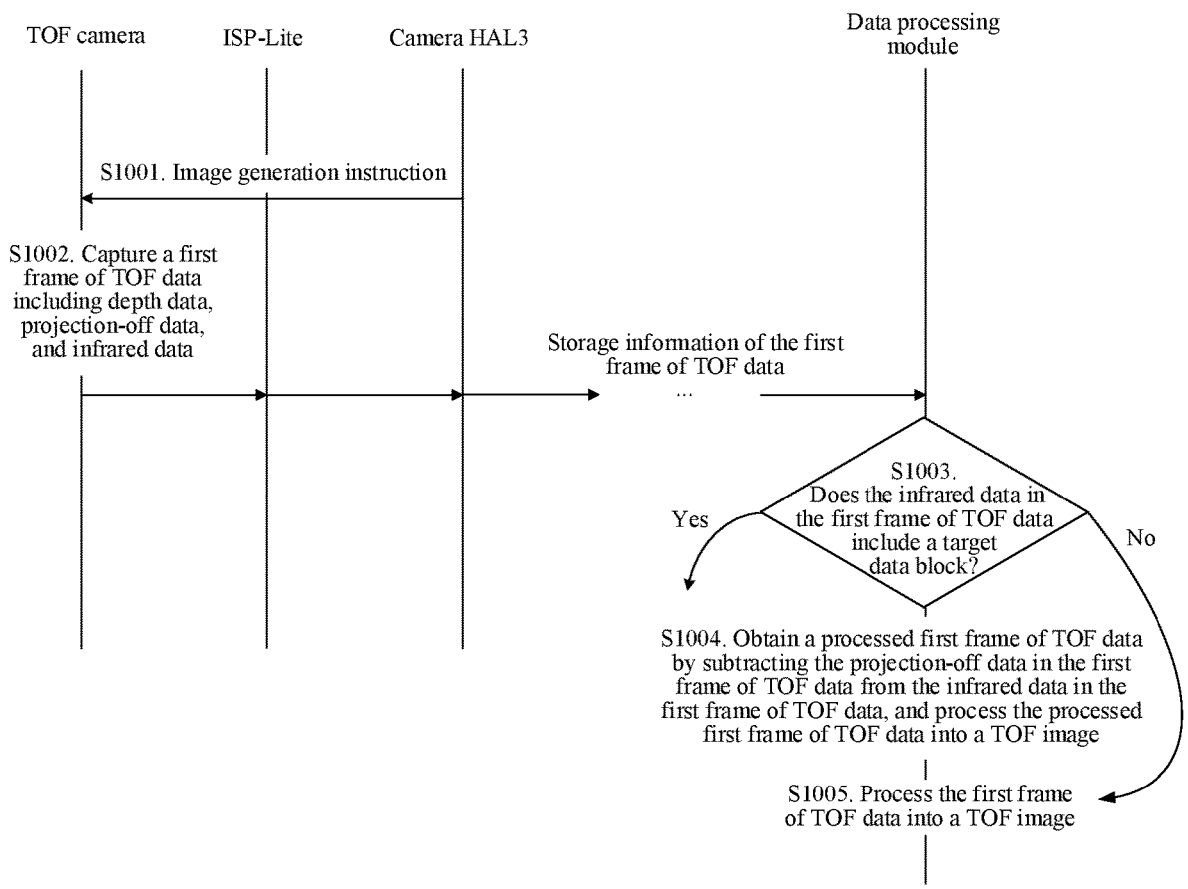
FIG. 10 is a flowchart of a data obtaining method according to an embodiment of this application.

FIG. 10 is a data obtaining method disclosed in an embodiment of this application. The method is performed by the foregoing electronic device. With reference to FIG. 2 to FIG. 6, the procedure shown in FIG. 10 starts to be performed from driving, by the camera HAL3 by using the TOF camera driver, the TOF camera to capture data, and includes the following steps.

S1001. The camera HAL3 transmits an image generation instruction to the TOF camera in response to an image request.

With reference to FIG. 2 and FIG. 3, it may be understood that the camera HAL3 may transmit the image generation instruction to the TOF camera by using the TOF camera driver at the kernel layer.

S1002. In response to the image generation instruction, the TOF camera captures a first frame of TOF data including depth data, projection-off data, and infrared data.

The depth data is data used to generate a depth map. The projection-off data is TOF data captured by the TOF camera when the TOF light source is turned off. The infrared data is data used to generate an infrared image.

The depth data and the infrared data are both TOF data captured by the TOF camera when the TOF light source is turned on.

When the TOF camera (powered on) is started, the TOF light source is turned on by default. In some implementations, the TOF sensor controller of the TOF camera transmits the image generation instruction to the TOF sensor, and the TOF sensor captures the depth data in response to the image generation instruction and transmits a turn-off instruction to the TOF light source controller. The TOF light source controller turns off the TOF light source in response to the turn-off instruction, and the TOF sensor captures the projection-off data. The TOF sensor transmits a turn-on instruction to the TOF light source controller. The TOF light source controller turns on the TOF light source in response to the turn-on instruction, and the TOF sensor captures the infrared data.

In some implementations, one example of the first frame of TOF data is: four groups of depth data, one group of projection-off data, and one group of infrared data. "One group of data" may be understood as a two-dimensional array.

The TOF sensor first captures each group of depth data with first exposure duration, captures infrared data with second exposure duration, and captures projection-off data with the first exposure duration or the second exposure duration. The first exposure duration and the second exposure duration may be carried in the image generation instruction by the camera HAL3 or transmitted to the TOF camera separately, or transmitted to the TOF camera by other modules, or obtained by the TOF camera from the storage module in advance.

It may be understood that an occasion when the TOF sensor sends the turn-off instruction to the TOF light source controller is related to the first exposure duration, and that an occasion when the TOF sensor sends the turn-on instruction to the TOF light source controller is related to the exposure duration of the projection-off data.

In some implementations, the TOF sensor may mark TOF data captured within a first time range as projection-off data. The first time range may be determined based on interval duration between the time when the TOF sensor sends the turn-off instruction and the time when the TOF sensor sends the turn-on instruction. The TOF sensor may mark TOF data captured before the first time range as depth data, and mark TOF data captured after the first time range as infrared data.

It may be understood that an order of capturing the depth data, the projection-off data, and the infrared data by the TOF camera is not limited. For example, the order of capture may be the projection-off data, the infrared data, and the depth data, or the order of capture may be the infrared data, the depth data, and the projection-off data. The occasions when the TOF sensor transmits the turn-off instruction and the turn-on instruction to the TOF light source controller are adjusted based on the order.

In this step, using the TOF sensor to control turn-on of the TOF light source or turn-off of the TOF light source achieves a higher execution speed.

S1003. After obtaining the first frame of TOF data, the data processing module determines whether the infrared data in the first frame of TOF data includes a target data block, and if yes, performs S1004, or if no, performs S1005.

A specific manner of obtaining the first frame of TOF data by the data processing module is shown in FIG. 4, FIG. 5, or FIG. 6, and is not described herein again.

The infrared data is a two-dimensional array. It may be understood that the two-dimensional array includes some values arranged in rows and columns. Each value can be considered as a data point. The target data block is a data block that satisfies the following preset condition: A quantity of data points whose values are greater than a first threshold is greater than a second threshold.

As described above, the infrared data captured by the TOF sensor is a two-dimensional array and is processed by the ISP-Lite into infrared raw data, that is, an infrared raw image. Therefore, it may be understood that the target data block is a target region in the infrared raw image, and each value in the target data block is a luminance value of a corresponding pixel in the target region. Therefore, for the infrared raw image, the target region is a region in which a quantity of pixels whose luminance values are greater than a first threshold is greater than a second threshold.

When the ambient light is extremely strong and the TOF camera faces a strong light source, the TOF data captured by the TOF camera is usually overexposed due to the strong light. Therefore, luminance of most of pixel values in an overexposed region in the infrared raw image generated by the TOF data is excessively high, and recognition is affected. The condition of the target region (data block) in this step is set based on this principle.

S1004. Obtain a processed first frame of TOF data by subtracting the projection-off data in the first frame of TOF data from the infrared data in the first frame of TOF data, and process the processed first frame of TOF data into a TOF image.

S1005. Process the first frame of TOF data into a TOF image.

It may be understood that processing the first frame of TOF data into the TOF image means processing the depth data in the first frame of TOF data into a depth map and processing the infrared data in the first frame of TOF data into an infrared image.

In the method described in this embodiment, when the infrared data in the first frame of TOF data is overexposed, impact of the ambient light on the infrared data is eliminated by subtracting the projection-off data from the infrared data in the first frame of TOF data. Therefore, quality of the first frame of TOF data is improved, and a high-quality TOF image is further obtained. This helps improve the accuracy and speed of face recognition.

Figure 11:
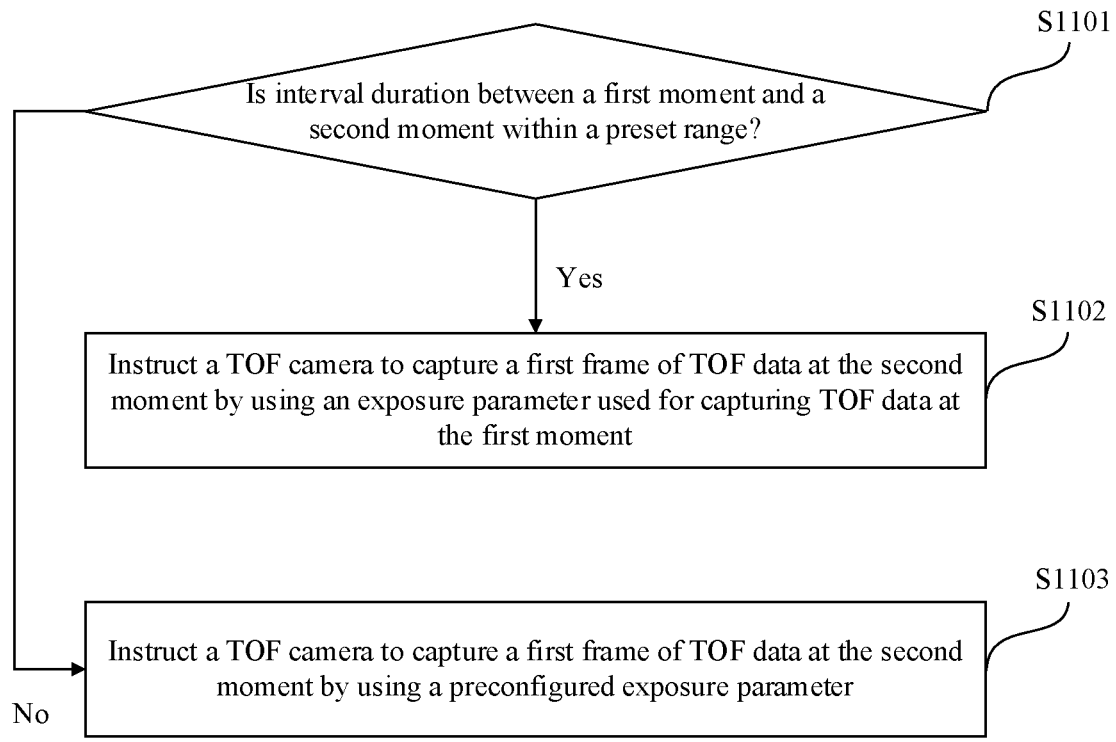
FIG. 11 is a flowchart of another data obtaining method according to an embodiment of this application.

FIG. 11 is another data obtaining method disclosed in an embodiment of this application. The method is performed by the camera HAL3 shown in FIG. 3 and includes the following steps.

S1101. In response to an image request, determine whether interval duration is within a preset range, and if yes, perform S1102, or if no, perform S1103.

The interval duration is interval duration between a moment when TOF data is last captured (first moment for short) and a moment when a first frame of TOF data is to be captured (second moment for short).

It may be understood that, because the camera HAL3 drives, by using the TOF camera driver at the kernel layer, the TOF camera to capture TOF data, the camera HAL3 can select the second moment based on a time of sending an image generation instruction to the TOF camera driver. For example, a moment obtained after a delay is added to the moment of sending the image generation instruction to the TOF camera driver is used as the second moment. For another example, to simplify the procedure, the camera HAL3 can directly use a current moment of the system as the second moment.

In this embodiment, the first frame of TOF data refers to a first frame of TOF data captured by the TOF camera as triggered by an application that sends a task request, as shown in FIG. 4, FIG. 5, or FIG. 6. "Last" may be a last frame of TOF data captured by the TOF camera as triggered by an application that last sends a task request.

S1102. Instruct the TOF camera to capture the first frame of TOF data at the second moment by using an exposure parameter used for the last capture of TOF data.

As described above, because an AE result can be used to adjust a parameter of the TOF camera, the exposure parameter used for the last capture of TOF data is probably an adjusted exposure parameter, and because the interval duration between the first moment and the second moment is within the preset range, a current environment is probably the same as an environment in which the last capture is performed. Therefore, the exposure parameter used for the last capture of TOF data is also probably applicable to the current environment. This helps obtain high-quality TOF data and helps obtain a high-quality TOF image.

S1103. Instruct the TOF camera to capture the first frame of TOF data by using a preconfigured exposure parameter.

If the interval duration between the first moment and the second moment is long, it indicates that a long time has elapsed since the last capture of TOF data. Therefore, the environment in which the electronic device is located has changed probably. Therefore, the exposure parameter used for the last capture of TOF data is no longer applicable to the current environment. Therefore, it is not meaningful to use the exposure parameter used for the last capture of TOF data. Therefore, the preconfigured exposure parameter is used.

The data obtaining method described in this embodiment fully uses the exposure parameter adjusted by the AE adjustment mechanism, improves quality of the first frame of TOF data, and further obtains a high-quality TOF image. This helps improve the accuracy and speed of face recognition.

It may be understood that, in the foregoing steps, the exposure parameter used for the last capture of TOF data is only an implementation. Because the moment of the last capture of TOF data is a moment closest to the second moment, a purpose of comparison with the last capture of TOF data is to save computing resources.

However, in this embodiment, the comparison with the last capture of TOF data is not limited. As long as the capture is any capture before the second moment, the comparison with the second moment can be performed. Therefore, a condition satisfied by the first moment can be summarized as follows: It is earlier than the second moment and the interval duration from the second moment is within the preset range.

Figure 12:
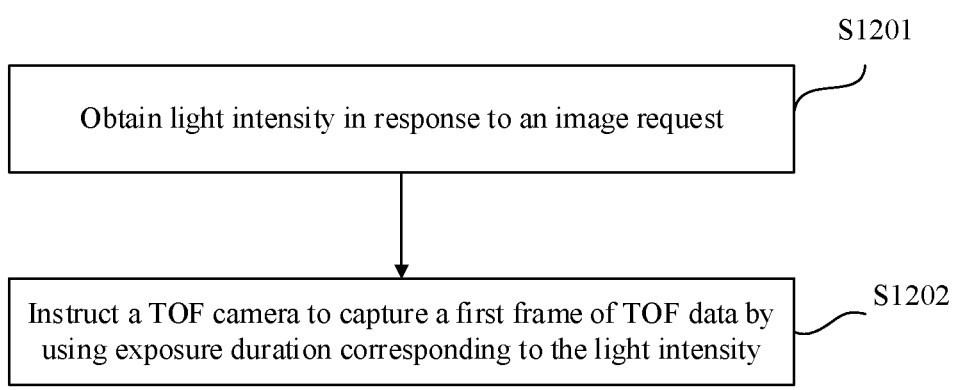
FIG. 12 is a flowchart of another data obtaining method according to an embodiment of this application.

FIG. 12 is another data obtaining method disclosed in an embodiment of this application. The method is performed by the camera HAL3 shown in FIG. 3 and includes the following steps.

S1201. Obtain light intensity in response to an image request.

In this step, the ambient light sensor on the electronic device may be used to obtain light intensity of an environment in which the electronic device is located.

S1202. Instruct the TOF camera to capture a first frame of TOF data by using exposure duration corresponding to the light intensity.

In this embodiment, a plurality of correspondences between light intensity intervals and exposure duration are preconfigured, and the correspondences satisfy the following principles:

1. The light intensity intervals include an indoor light intensity interval and an outdoor light intensity interval.

Preconfigured fixed exposure duration may not be applicable to an outdoor environment. Therefore, exposure duration used in an indoor environment is different from that used in the outdoor environment. Therefore, the light intensity intervals need to be used to reflect this difference.

Further, because the light intensity varies widely in the outdoor environment, it is necessary to further distinguish exposure parameters used in different light intensity intervals in the outdoor environment.

2. If a value in each light intensity interval is larger, corresponding exposure duration is shorter.

If the exposure duration is longer, luminance of an image is higher. Therefore, in the outdoor environment, a problem of over-high luminance of the image and reduction of definition may be avoided only by shortening the exposure duration.

An example of a correspondence configured based on the foregoing principles is:

$$L \leq 500 \text{ lux, and } t = 1 \text{ ms (default fixed value);}$$

$$500 \text{ lux} < L \leq 3000 \text{ lux, and } t = 0.7 \text{ ms}$$

$$3000 \text{ lux} < L \leq 30000 \text{ lux, and } t = 0.5 \text{ ms;}$$

$$L > 30000 \text{ lux, and } t = 0.3 \text{ ms.}$$

In the foregoing example, L represents the light intensity value, t represents the exposure duration, and L s 500 lux is the indoor light intensity interval, that is, if L is less than 500 lux, it can be considered that the electronic device is in the indoor environment. In this case, the default fixed exposure duration may be used.

500 lux<L≤3000 lux, 3000 lux<L≤30000 lux, and L>30000 lux are intervals obtained through further division for the outdoor environment. It can be seen that among the three intervals, if the value is larger, the corresponding exposure duration is shorter.

It may be understood that a granularity of the intensity interval of the outdoor environment in the foregoing example can be adjusted. If the granularity is smaller, exposure time control is finer, and this is more helpful for improving image quality and more helpful for improving an image processing speed.

It may be understood that the camera HAL3 can transmit, to the TOF sensor controller of the TOF camera by using the TOF camera driver, the exposure duration corresponding to the light intensity.

It can be seen that in this embodiment, the exposure duration for capturing TOF data is obtained based on the light intensity of the environment in which the electronic device is located. This helps capture TOF data whose luminance satisfies a requirement of face recognition in the first frame and therefore helps improve the accuracy and speed of face recognition.

Figure 13:
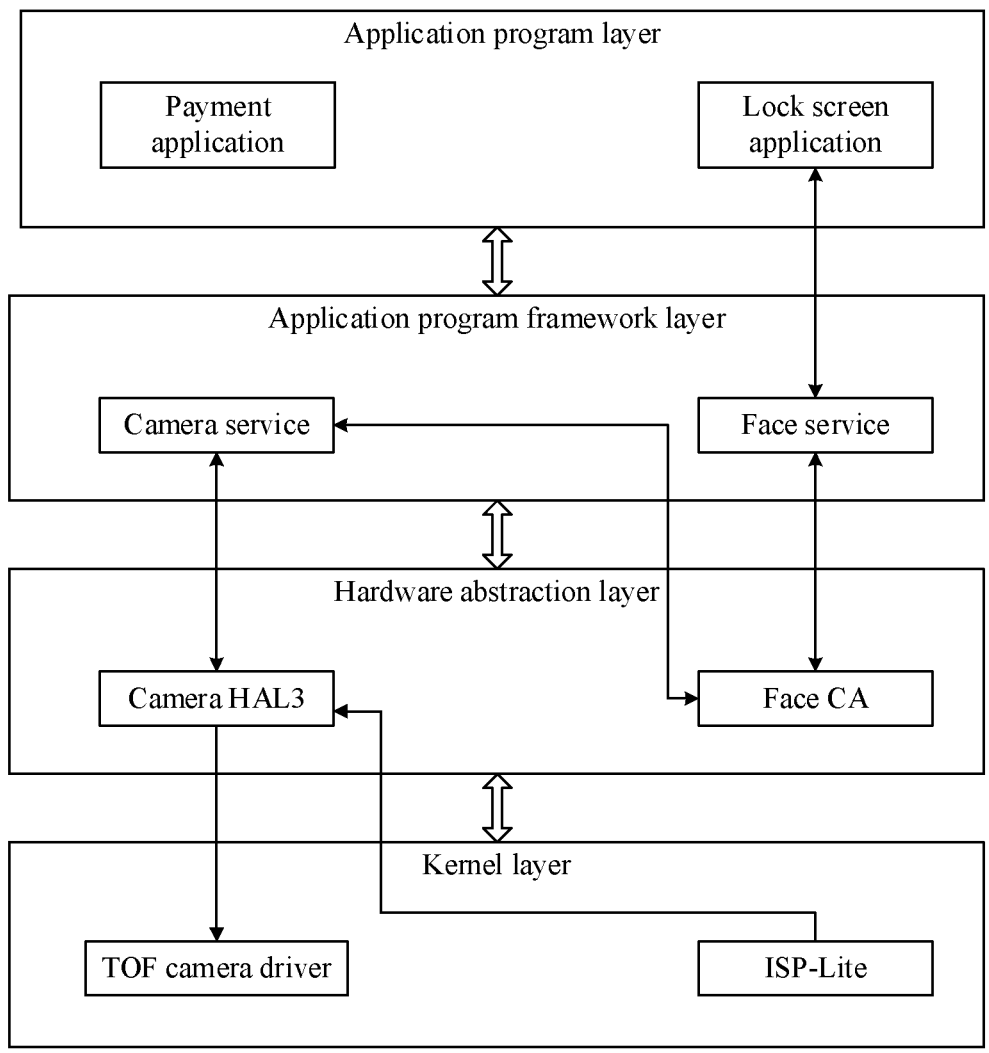
FIG. 13 is a schematic diagram of another software framework for implementing face recognition by an electronic device.

It should be noted that the procedures shown in FIG. 7 to FIG. 12 are not limited to the software framework shown in FIG. 3, but can also be applied to a software framework shown in FIG. 13.

In FIG. 13, no TEE is disposed, that is, TOF data processing and face recognition are both performed in an REE, and specifically, may be performed in a face CA. Therefore, TOF data instead of storage information of the TOF data can be directly transmitted between modules. To be specific, a difference between FIG. 13 and FIG. 3 is that after an ISP-Lite receives TOF data captured by a TOF camera, the TOF data is transmitted to the face CA by using a camera HAL3 and a camera service. The face CA processes the TOF data into a TOF image and performs face recognition by using the TOF image.

Based on FIG. 13, in the procedure shown in FIG. 7, each step is performed by the face CA: After receiving a first frame of TOF data, the face CA processes the first frame of TOF data into a first frame of TOF image, obtains a first AE result, transmits the first AE result to the camera HAL3, and performs face recognition by using the first frame of TOF image, to obtain a first recognition result. If the first recognition result indicates that the recognition succeeds, the first recognition result is transmitted to a face service; or if the first recognition result indicates that the recognition fails, a seventh frame of TOF data is received again.

Based on FIG. 13, in the procedure shown in FIG. 8, each step is performed by the face CA. Details are not described herein again.

Based on FIG. 13 and the procedure shown in FIG. 10, the data processing module may be replaced with the face CA. Details are not described herein again.

The procedures shown in FIG. 11 and FIG. 12 are applicable to FIG. 13.

It may be understood that the procedures shown in FIG. 7 to FIG. 12 are not limited to the Android operating system. In other operating systems, a module having the same function as the data processing module can implement the steps performed by the foregoing data processing module, and a module having the same function as the camera HAL3 can implement the foregoing steps performed by the camera HAL3.

Figure 14:
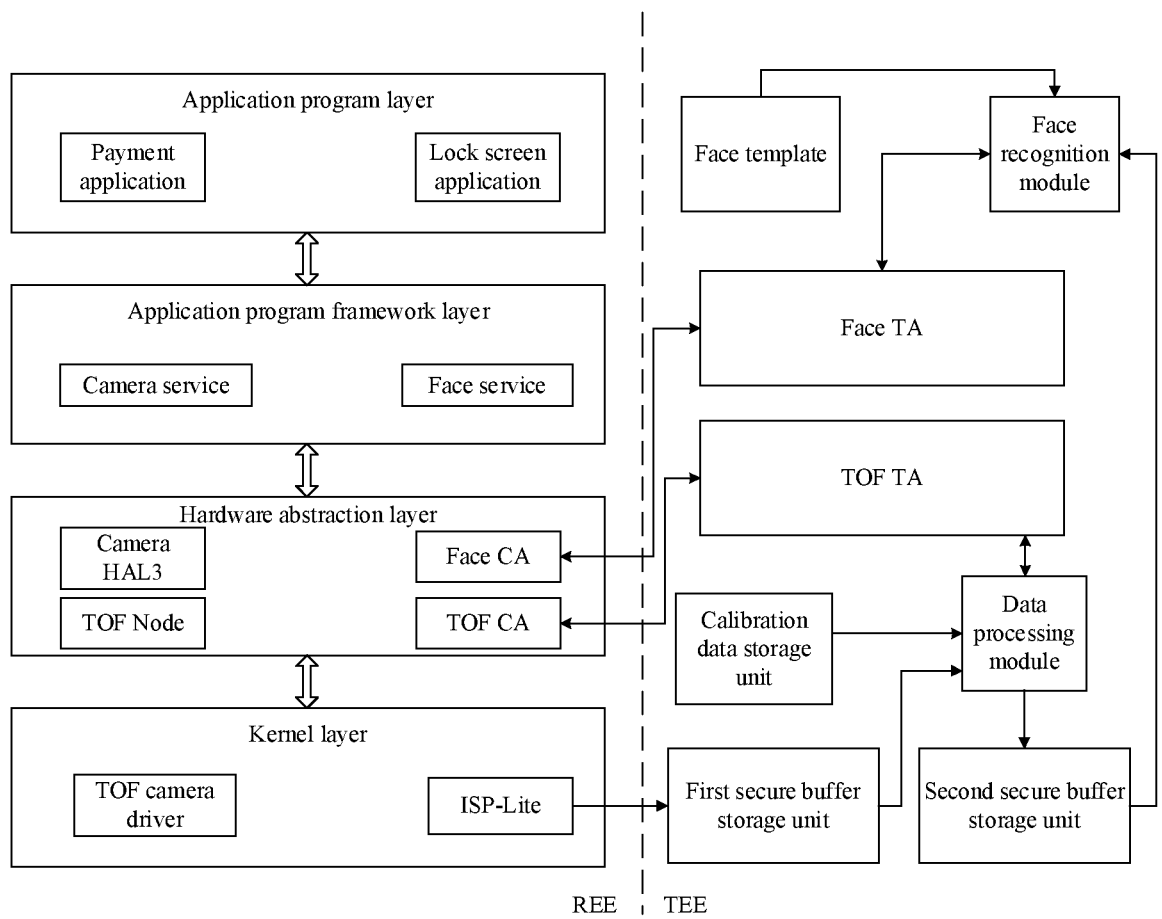
FIG. 14 is a schematic diagram of another software framework for implementing face recognition by an electronic device according to an embodiment of this application.

In the embodiments of this application, processing TOF data into a TOF image in the TEE and performing face recognition in the TEE by using the TOF image can be not only implemented by using the software framework shown in FIG. 3, but also implemented by using a software framework shown in FIG. 14.

A difference between FIG. 14 and FIG. 3 is that in addition to the camera HAL3 and the face CA, a TOF node (Node) and a TOF CA are added to the hardware abstraction layer. In the following embodiments, the TOF node (Node) is a camera domain data interaction center.

In the TEE, a TOF TA is added to invoke a data processing unit and communicate with the REE. A function of the TOF CA is similar to that of the face CA. In the following embodiments, the TOF CA is used to access the TOF TA.

Figure 15:
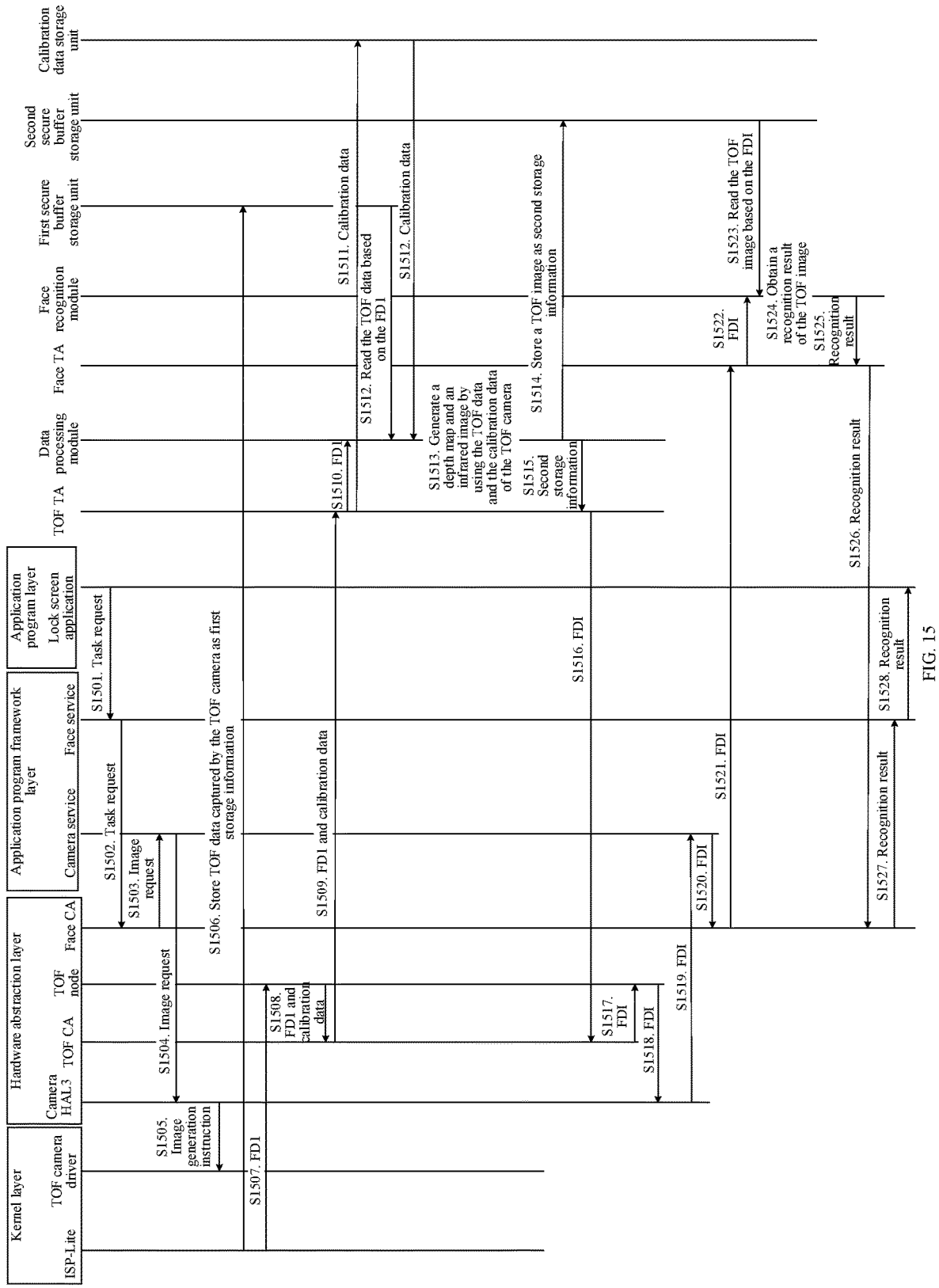
FIG. 15 is a flowchart of another face recognition method according to an embodiment of this application.

Based on FIG. 14, an implementation procedure of the face recognition method disclosed in this application is shown in FIG. 15:

S1501 to S1506 are the same as S401 to S406. Refer to FIG. 15. Details are not described herein again.

S1507. Transmit an FD1 to the TOF node by using the ISP-Lite at the kernel layer.

S1508. Transmit the FD1 and calibration data to the TOF CA by using the TOF node.

Because the calibration data needs to be used for generating a TOF image subsequently, the TOF node obtains the calibration data preconfigured in the REE and transmits the calibration data together with the FD1 to the TEE. Optionally, the TOF node may obtain a part of the calibration data from a storage unit of the REE, and may obtain another part of the calibration data from the TOF camera.

It may be understood that the calibration data may alternatively be obtained by the camera HAL3 and transmitted to the TOF node.

S1509. Transmit the FD1 and the calibration data to the TOF TA by using the TOF CA.

S1510. Transmit the FD1 to the data processing module of the TEE by using the TOF TA.

S1511. Store the calibration data in a calibration data storage unit of the TEE by using the TOF TA.

It may be understood that an execution order of S1510 and S1511 is not limited.

S1512 to S1514 are functions of the data processing module, and are the same as the functions of the data processing module shown in FIG. 4. Refer to FIG. 15. Details are not described herein again.

S1515. Transmit the second storage information to the TOF TA by using the data processing module.

S1516. Transmit the second storage information to the TOF CA by using the TOF TA.

It may be understood that the second storage information is also transmitted in a form of a ciphertext. For ease of description, the ciphertext of the second storage information is abbreviated as an FDI.

S1517. Transmit the FDI to the TOF node by using the TOF CA.

S1518. Transmit the FDI to the camera HAL3 by using the TOF node.

S1519. Transmit the FDI to the camera service by using the camera HAL3.

S1520. Transmit the FDI to the face CA by using the camera service.

S1521. Transmit the FDI to the face TA by using the face CA.

S1522. Transmit the FDI to the face recognition module of the TEE by using the face TA.

S1523 and S1524 are functions of the face recognition module, and are the same as the functions of the face recognition module shown in FIG. 4. Refer to FIG. 15. Details are not described herein again.

S1525 to S1528 are a procedure for transmitting a recognition result to an application initiating a task, and are the same as those shown in FIG. 4. Refer to FIG. 15. Details are not described herein again.

It may be understood that because the calibration data is camera domain data rather than face domain data, the TOF data is transmitted to the TEE by using the TOF node, the TOF CA, and the TOF TA, and the TOF data is processed into a TOF image in the TEE. The processing is performed separately from processing of the TOF image and conforms to division logic of the camera domain and the face domain. In addition, there is no need to perform excessive interaction between different domains. This can reduce workload of coupling, make the logic clear, and facilitate development and maintenance.

In FIG. 15, without considering processing delays and transmission delays of other modules, the ISP-Lite also sequentially stores each frame of TOF data in the first secure buffer storage unit at an interval of first duration, and also sequentially transmits storage information of each frame of TOF data to the TOF node at the interval of the first duration. The TOF node also sequentially transmits the storage information of each frame of TOF data to the TOF TA at the interval of the first duration by using the TOF CA. Therefore, the TOF TA also sequentially receives the storage information of each frame of TOF data at the interval of the first duration. In FIG. 15, S1506 may be storing any frame of TOF data, S1507 to S1510 may be transmitting an FD of any frame of TOF data, and S1513 to S1515 are a procedure for processing this frame of TOF data. S1516 to S1522 are a procedure for transmitting storage information of the TOF image generated for this frame of TOF data, and S1523 to S1525 are a procedure for processing the TOF image generated for this frame of TOF data. S1526 to S1528 may be a procedure for processing a recognition result of the TOF image generated for this frame of TOF data, or may be a procedure for processing recognition results of TOF images generated for a plurality of frames of TOF data.

Figure 16:
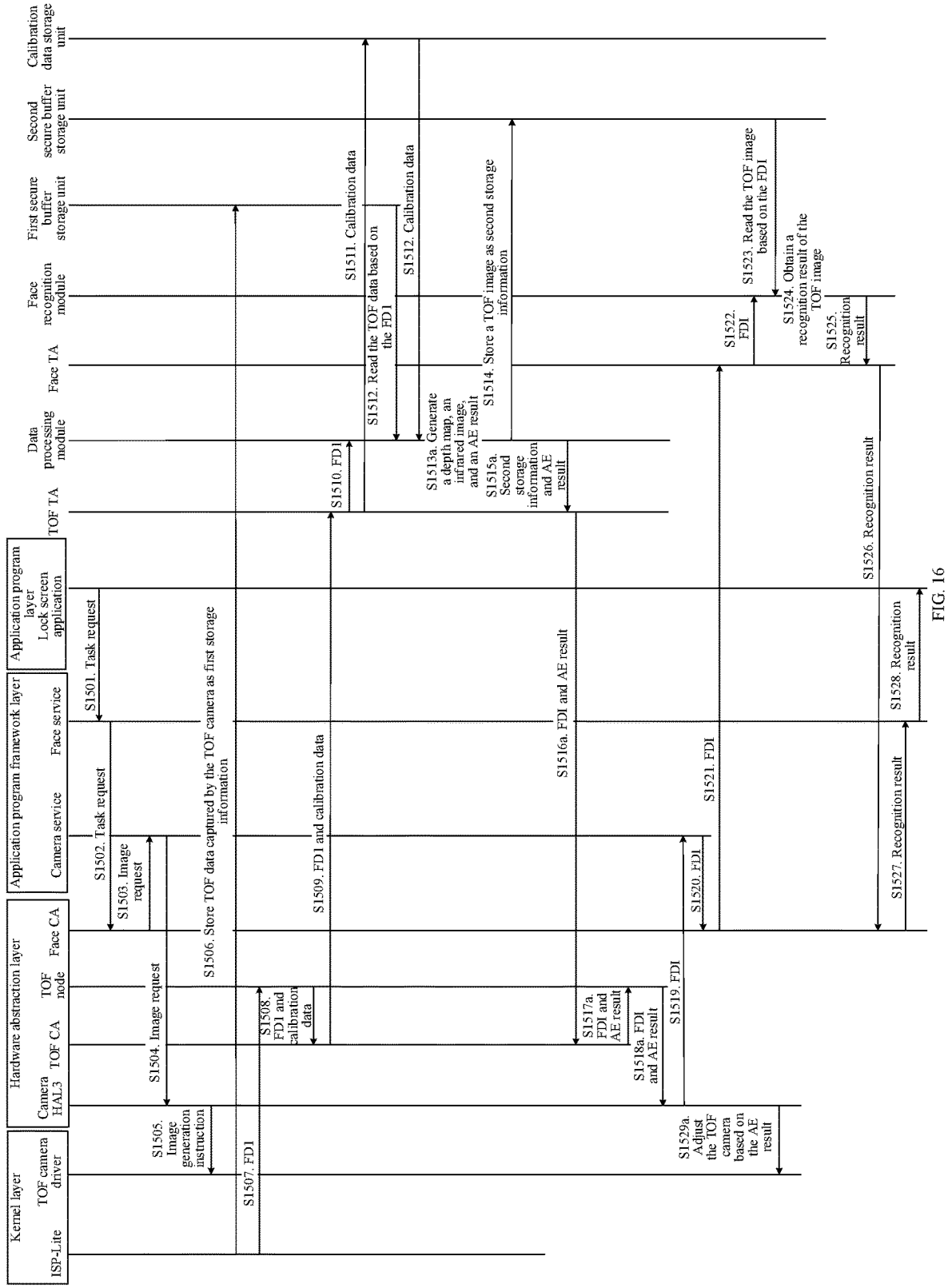
FIG. 16 is a flowchart of another face recognition method according to an embodiment of this application.

FIG. 16 shows a procedure for generating and feeding back an automatic exposure (Automatic Exposure, AE) result and controlling a camera based on the AE result. Only differences between FIG. 16 and FIG. 15 are described herein.

S1513a. By using the data processing module of the TEE, generate a depth map, an infrared image, and an AE result in response to the TOF data being a face recognition frame.

S1515a. Transmit the second storage information and the AE result to the TOF TA of the TEE by using the data processing module of the TEE.

S1516a. Transmit an FDI and the AE result to the TOF CA by using the TOF TA.

S1517a. Transmit the FDI and the AE result to the TOF node by using the TOF CA.

S1518a. Transmit the FDI and the AE result to the camera HAL3 by using the TOF node.

S1529a. Adjust the TOF camera based on the AE result by using the camera HAL3 by using the TOF camera driver.

For the specific implementation of each of the foregoing steps, refer to the description of the steps in FIG. 5. Details are not described herein again.

Figure 17:
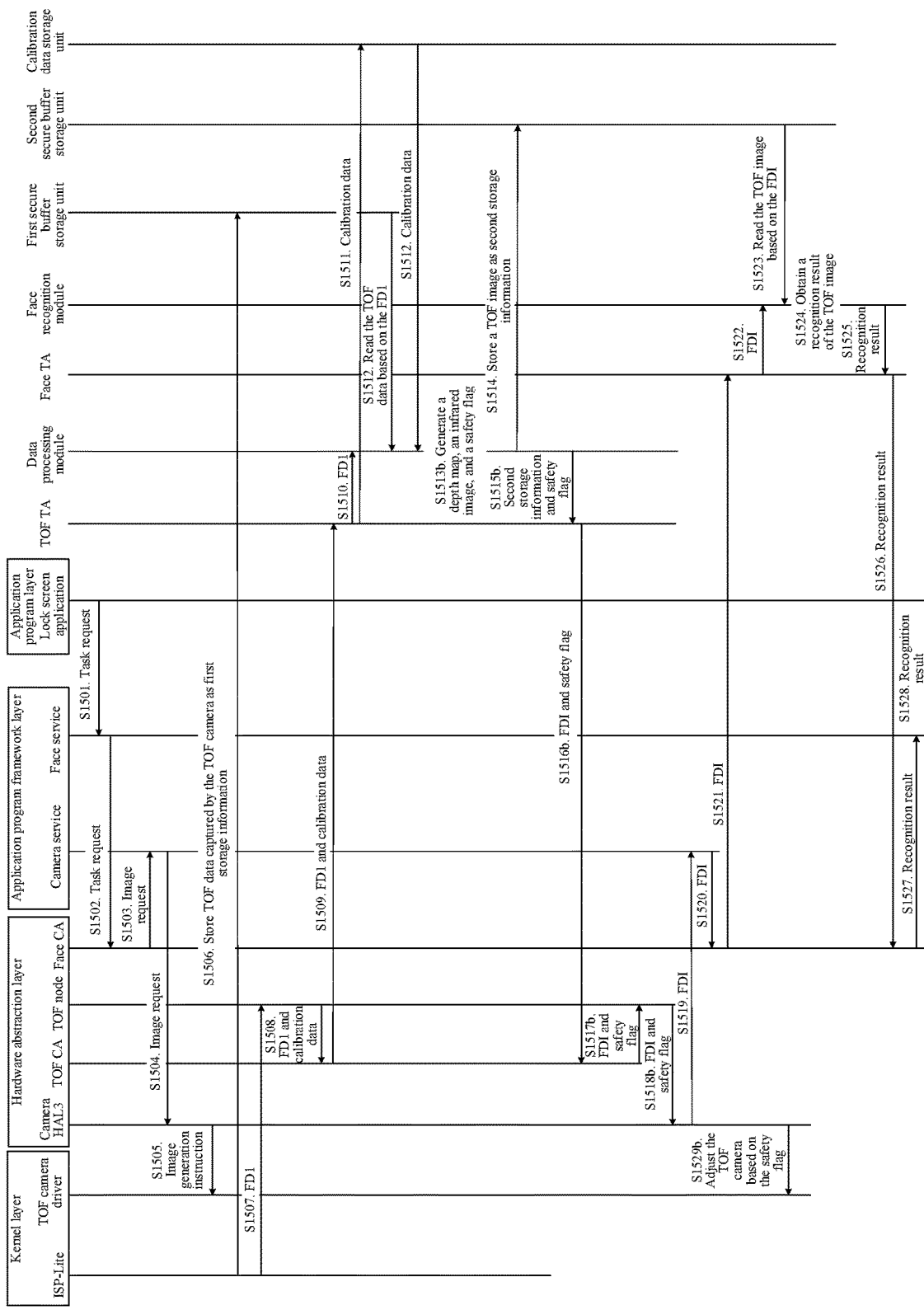
FIG. 17 is a flowchart of another face recognition method according to an embodiment of this application.

FIG. 17 shows a procedure for generating and feeding back a safety flag, and controlling a camera based on the safety flag. Only differences between FIG. 17 and FIG. 15 are described herein.

S1513b. By using the data processing module of the TEE, generate a depth map, an infrared image, and a safety flag in response to the TOF data being a safety indication frame.

S1515b. Transmit the second storage information and the safety flag to the TOF TA of the TEE by using the data processing module of the TEE.

S1516b. Transmit an FDI and the safety flag to the TOF CA by using the TOF TA.

S1517b. Transmit the FDI and the safety flag to the TOF node by using the TOF CA.

S1518b. Transmit the FDI and the safety flag to the camera HAL3 by using the TOF node.

S1529b. Adjust the TOF camera based on the safety flag by using the camera HAL3 by using the TOF camera driver.

For the specific implementation of each of the foregoing steps, refer to the description of the steps in FIG. 6. Details are not described herein again.

Figure 18:
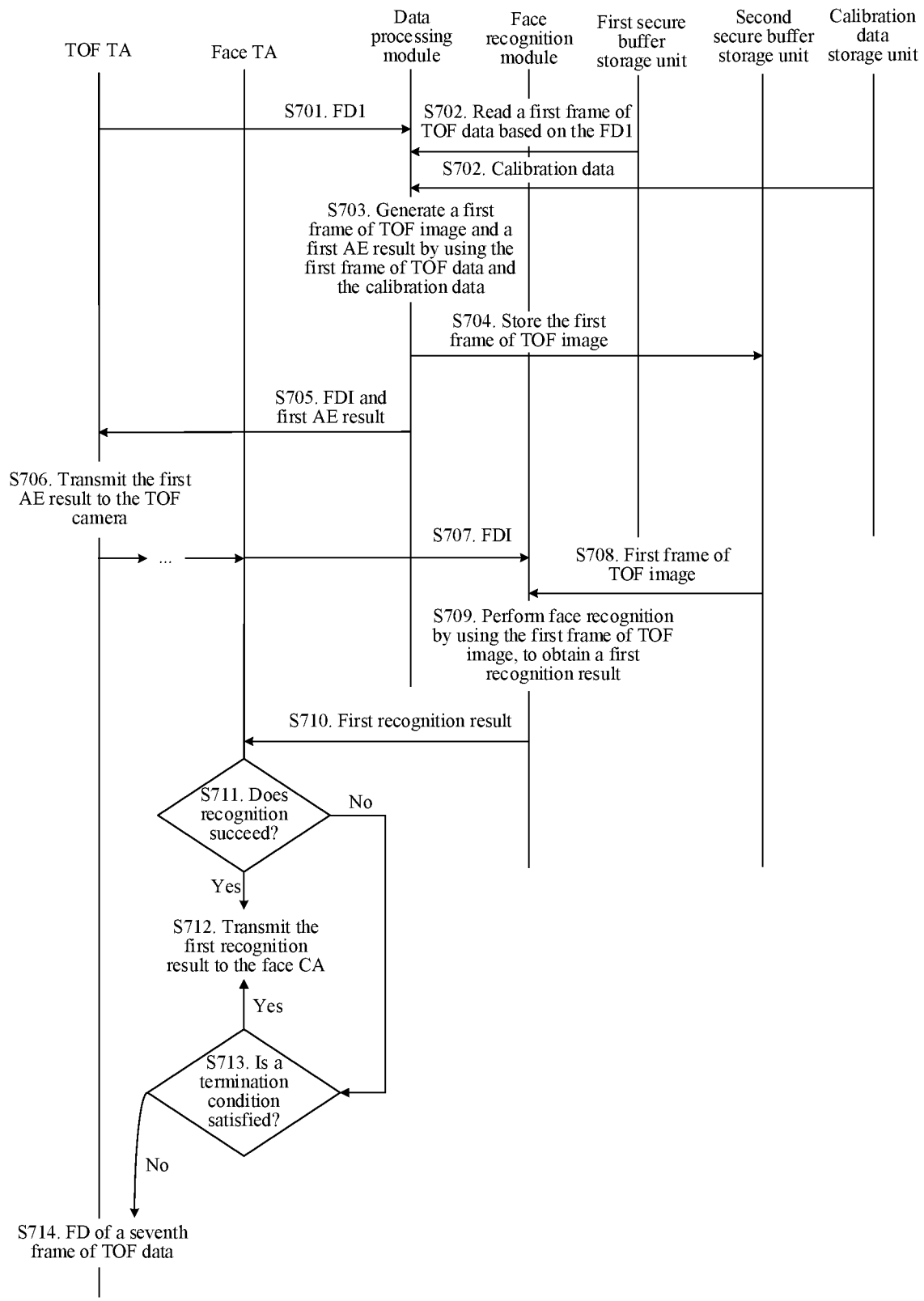
FIG. 18 is a flowchart of a data processing method according to an embodiment of this application.

FIG. 18 is the procedure shown in FIG. 7. Based on the implementation of the software framework shown in FIG. 14, differences between FIG. 18 and FIG. 7 lie in that an FD of a TOF data frame is transmitted by the TOF TA to the data processing module, and an AE result and an FD of a TOF image (using an FDI as an example) are also transmitted by the TOF TA. Other steps are the same as those in FIG. 7. Refer to FIG. 18 for details. Details are not described herein again.

It may be understood that, in comparison with the time consumed by TOF data processing and face recognition, the time used by the TOF TA to transmit the FDI to the face recognition module through the path shown in FIG. 15, FIG. 16, or FIG. 17 is very short and therefore can be ignored. Therefore, processing duration of the procedure shown in FIG. 18 is equivalent to that of the procedure shown in FIG. 7.

Figure 19:
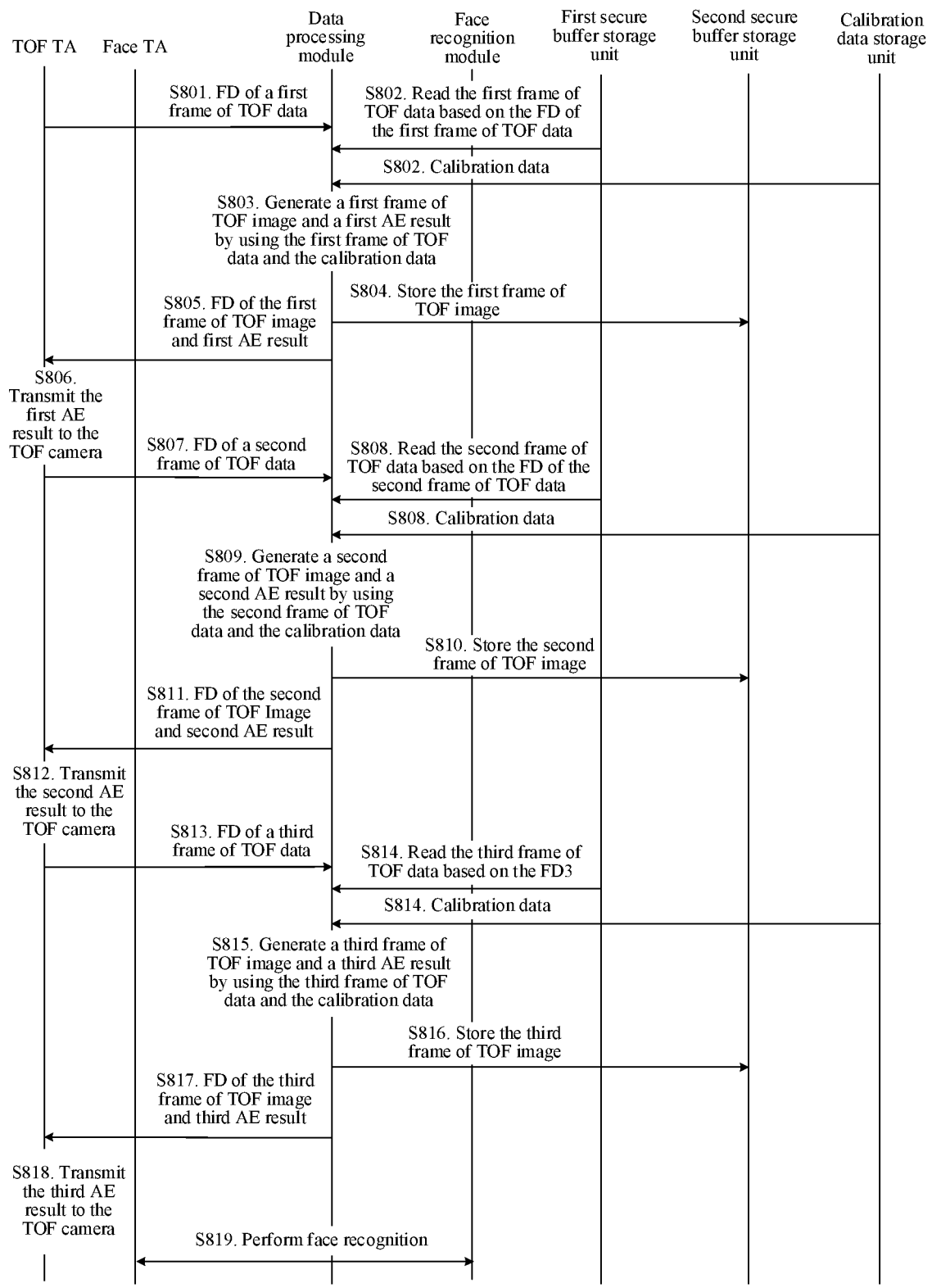
FIG. 19 is a flowchart of another data processing method according to an embodiment of this application.

FIG. 19 is the procedure shown in FIG. 8. Based on the implementation of the software framework shown in FIG. 14, differences between FIG. 19 and FIG. 8 lie in that an FD of a TOF data frame is transmitted by the TOF TA to the data processing module, and an AE result and an FD of a TOF image (using an FDI as an example) are also transmitted by the TOF TA. Other steps are the same as those in FIG. 8. Refer to FIG. 18 for details. Details are not described herein again.

It may be understood that, similarly, the foregoing method described in FIG. 18 or FIG. 19 may be used preferably with a determining condition: The TOF TA determines whether an intensity value of ambient light is greater than a preset first intensity threshold, and if yes, the data processing procedure shown in FIG. 18 is performed, or if no, the data processing procedure shown in FIG. 19 is performed.

It may be understood that the procedures shown in FIG. 10 to FIG. 12 are also applicable to the software framework shown in FIG. 14.

An embodiment of this application further discloses a system-on-chip, including at least one processor and an interface, where the interface is configured to receive code instructions and transmit the code instructions to the at least one processor; and the at least one processor runs the code instructions to implement at least one of the face recognition method, the data obtaining method, and the data processing method.

For a specific procedure for implementing the foregoing functions by the processor, refer to the foregoing embodiments. Details are not described herein again.

An embodiment of this application further discloses a computer-readable storage medium, where the readable storage medium stores program code, and when the program code is executed by a computer device, at least one of the face recognition method, the data obtaining method, and the data processing described in the foregoing embodiments is implemented.

What is claimed is:

1. A face recognition method, comprising:
obtaining time-of-flight (TOF) data, the TOF data comprises a safety indication frame and a face recognition frame;
storing, through a kernel layer, the TOF data into a trusted execution environment (TEE);
generating an automatic exposure (AE) result in the TEE based on the TOF data, wherein the AE result is used to adjust an exposure parameter of a TOF camera;
transmitting first storage information of the TOF data in the TEE from a rich execution environment (REE) to the TEE, wherein the first storage information indicates a storage address of the TOF data in the TEE;
processing the TOF data corresponding to the first storage information into a TOF image in the TEE; and
performing face recognition in the TEE using the TOF image to obtain a recognition result.

2. The face recognition method of claim 1, wherein the processing the TOF data corresponding to the first storage information into the TOF image comprises:
generating the TOF image using the TOF data and calibration data of the TOF camera.

3. The face recognition method of claim 2, wherein, before the generating the TOF image using the TOF data and the calibration data of the TOF camera, the method further comprises:
transmitting the calibration data from the REE to the TEE.

4. The face recognition method of claim 1, further comprising:
generating a safety flag in the TEE based on the TOF data, wherein the safety flag is used to indicate whether a TOF light source is safe for human eyes.

5. The face recognition method of claim 1, wherein after the obtaining the recognition result, the method further comprises:
transmitting the recognition result from the TEE to an application of the REE to trigger the application to perform a task using the recognition result.

6. The face recognition method of claim 1, wherein processing the face recognition frame in the TOF data into the TOF image comprises:
processing the TOF data into the TOF image in camera domain, and
wherein the performing the face recognition using the TOF image comprises:
performing the face recognition in a face domain using the TOF image.

7. The face recognition method of claim 1, wherein the transmitting the first storage information of the TOF data in the TEE from the REE to the TEE comprises:
transmitting the first storage information to the TEE using a communication protocol of the REE.

8. The face recognition method of claim 7, wherein the transmitting the first storage information to the TEE using the communication protocol of the REE comprises:
transmitting the first storage information to a camera hardware abstraction layer (camera HAL3) at a hardware abstraction layer by using the kernel layer;
transmitting the first storage information to a camera service at an application framework layer by using the camera HAL3;
transmitting the first storage information to a face application client at the hardware abstraction layer by using the camera service; and
transmitting the first storage information to a face trusted application of the TEE by using the face application client.

9. The face recognition method of claim 7, wherein the transmitting the first storage information to the TEE by using the communication protocol of the REE comprises:
transmitting the first storage information to a TOF node at a hardware abstraction layer by using the kernel layer;
transmitting the first storage information to a TOF application client at the hardware abstraction layer by using the TOF node; and
transmitting the first storage information to a TOF trusted application of the TEE by using the TOF application client.

10. The face recognition method of claim 1, wherein processing the face recognition frame in the TOF data into the TOF image in the TEE comprises:
transmitting the first storage information to a data processing module of the TEE by using a face trusted application or a TOF trusted application of the TEE; and
reading the TOF data from a first secure buffer storage unit based on the first storage information by using the data processing module, and processing the TOF data into the TOF image.

11. The face recognition method of claim 10, wherein after the processing the face recognition frame in the TOF data into the TOF image, the method further comprises:
storing the TOF image into a second secure buffer storage unit of the TEE as second storage information by using the data processing module;
transmitting the second storage information to the face trusted application or the TOF trusted application by using the data processing module; and
transmitting the second storage information to a face recognition module by using the face trusted application or the TOF trusted application.

12. An electronic device, comprising:
one or more processors; and
one or more storage devices storing instructions that are operable, when executed by the one or more processors, to cause the one or more processors to perform operations comprising:
obtaining time-of-flight (TOF) data, the TOF data comprises a safety indication frame and a face recognition frame;
storing, through a kernel layer, the TOF data into a trusted execution environment (TEE);
generating an automatic exposure (AE) result in the TEE based on the TOF data, wherein the AE result is used to adjust an exposure parameter of a TOF camera;
transmitting first storage information of the TOF data in the TEE from a rich execution environment (REE) to the TEE, wherein the first storage information indicates a storage address of the TOF data in the TEE;
processing the TOF data corresponding to the first storage information into a TOF image in the TEE; and
performing face recognition in the TEE using the TOF image, to obtain a recognition result.

13. The electronic device of claim 12, wherein the processing the TOF data corresponding to the first storage information into the TOF image comprises:
generating the TOF image using the TOF data and calibration data of the TOF camera, wherein the calibration data is transmitted from the REE to the TEE.

14. The electronic device of claim 12, wherein the transmitting the first storage information of the TOF data in the TEE from the REE to the TEE comprises:
transmitting the first storage information to the TEE using a communication protocol of the REE.

15. The electronic device of claim 14, wherein the transmitting the first storage information to the TEE using the communication protocol of the REE comprises:
transmitting the first storage information to a camera hardware abstraction layer (camera HAL3) at a hardware abstraction layer using the kernel layer;
transmitting the first storage information to a camera service at an application framework layer using the camera HAL3;
transmitting the first storage information to a face application client at the hardware abstraction layer using the camera service; and
transmitting the first storage information to a face trusted application of the TEE using the face application client.

16. A system-on-chip, comprising:
at least one processor and an interface, wherein the interface is configured to receive code instructions and transmit the code instructions to the at least one processor; and the at least one processor runs the code instructions to perform operations comprising:
obtaining time-of-flight (TOF) data, the TOF data comprises a safety indication frame and a face recognition frame;
storing, through a kernel layer, the TOF data into a trusted execution environment (TEE);
generating an automatic exposure (AE) result in the TEE based on the TOF data, wherein the AE result is used to adjust an exposure parameter of a TOF camera;
transmitting first storage information of the TOF data in the TEE from a rich execution environment (REE) to the TEE, wherein the first storage information indicates a storage address of the TOF data in the TEE;
processing the TOF data corresponding to the first storage information into a TOF image in the TEE; and
performing face recognition in the TEE using the TOF image, to obtain a recognition result.

17. The system-on-chip of claim 16, wherein the processing the TOF data corresponding to the first storage information into the TOF image comprises:
generating the TOF image using the TOF data and calibration data of the TOF camera, wherein the calibration data is transmitted from the REE to the TEE.

18. The system-on-chip of claim 16, wherein the transmitting the first storage information of the TOF data in the TEE from the REE to the TEE comprises:
transmitting the first storage information to the TEE using a communication protocol of the REE.

19. The system-on-chip of claim 18, wherein the transmitting the first storage information to the TEE using the communication protocol of the REE comprises:
transmitting the first storage information to a camera hardware abstraction layer (camera HAL3) at a hardware abstraction layer by using the kernel layer;
transmitting the first storage information to a camera service at an application framework layer by using the camera HAL3;
transmitting the first storage information to a face application client at the hardware abstraction layer by using the camera service; and
transmitting the first storage information to a face trusted application of the TEE by using the face application client.

* * * * *